United States Patent
Sidde et al.

(10) Patent No.: US 10,250,512 B2
(45) Date of Patent: Apr. 2, 2019

(54) SYSTEM AND METHOD FOR TRAFFIC DIRECTOR SUPPORT IN A MULTITENANT APPLICATION SERVER ENVIRONMENT

(71) Applicant: ORACLE INTERNATIONAL CORPORATION, Redwood Shores, CA (US)

(72) Inventors: Nagakishore Sidde, Bangalore (IN); Isvaran Krishnamurthy, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 261 days.

(21) Appl. No.: 15/213,166

(22) Filed: Jul. 18, 2016

(65) Prior Publication Data
US 2017/0034071 A1    Feb. 2, 2017

Related U.S. Application Data

(60) Provisional application No. 62/198,964, filed on Jul. 30, 2015.

(51) Int. Cl.
G06F 15/173  (2006.01)
H04L 12/825  (2013.01)
(Continued)

(52) U.S. Cl.
CPC .......... H04L 47/25 (2013.01); H04L 43/0876 (2013.01); H04L 47/829 (2013.01); H04L 67/1025 (2013.01); H04L 67/42 (2013.01)

(58) Field of Classification Search
CPC ... H04L 47/25; H04L 47/829; H04L 43/0876; H04L 67/1025; H04L 67/42
See application file for complete search history.

(56) References Cited

U.S. PATENT DOCUMENTS 5,838,916 A    11/1998 Domenikos et al.
6,247,109 B1    6/2001 Kleinsorge et al.
(Continued)

FOREIGN PATENT DOCUMENTS

CN    101639835    2/2010
CN    102170457    8/2011
(Continued)

OTHER PUBLICATIONS

United States Patent and Trademark Office, Office Action dated Mar. 24, 2017 for U.S. Appl. No. 14/747,853, 22 Pages.
(Continued)

Primary Examiner — Richard G Keehn
(74) Attorney, Agent, or Firm — Tucker Ellis LLP

(57) ABSTRACT

In accordance with an embodiment, described herein is a system and method for traffic director support in a multi-tenant application server environment. An exemplary method can provide one or more partitions, wherein each partition provides an administrative and runtime subdivision of the domain, one or more resource groups, wherein each of the one or more resource groups is associated with a partition of the one or more partition, one or more virtual targets, and an instance of a traffic director comprising a configuration. The method can target each of the one or more partitions and the one or more resource groups to a virtual target of the one or more virtual targets. The method can also configure the configuration of the traffic director, wherein the instance of a traffic director provides load balancing among one or more servers of a server pool.

20 Claims, 10 Drawing Sheets

(51) Int. Cl.
*H04L 12/26* (2006.01)
*H04L 29/08* (2006.01)
*H04L 29/06* (2006.01)
*H04L 12/911* (2013.01)

(56) References Cited

U.S. PATENT DOCUMENTS

| | | |
|---|---|---|
| 6,542,926 B2 | 4/2003 | Zalewski et al. |
| 6,725,317 B1 | 4/2004 | Bouchier et al. |
| 6,845,503 B1 | 1/2005 | Carlson et al. |
| 6,922,685 B2 | 7/2005 | Greene et al. |
| 6,931,638 B2 | 8/2005 | Daynes et al. |
| 6,959,370 B2 | 10/2005 | Shaw et al. |
| 6,980,980 B1 | 12/2005 | Yeh |
| 7,003,768 B2 | 2/2006 | Daynes et al. |
| 7,065,755 B2 | 6/2006 | Daynes et al. |
| 7,165,255 B2 | 1/2007 | Czajkowski et al. |
| 7,454,448 B1 | 11/2008 | Daynes et al. |
| 7,590,984 B2 | 9/2009 | Kaufman et al. |
| 7,627,621 B2 | 12/2009 | Daynes et al. |
| 7,660,824 B2 | 2/2010 | Halpern et al. |
| 7,685,131 B2 | 3/2010 | Batra et al. |
| 7,698,698 B2 | 4/2010 | Lai |
| 7,702,649 B1 | 4/2010 | Bresch et al. |
| 7,725,559 B2 | 5/2010 | Landis et al. |
| 7,756,912 B2 | 7/2010 | Daynes et al. |
| 7,765,187 B2 | 7/2010 | Bergant et al. |
| 7,870,171 B2 | 1/2011 | Daynes et al. |
| 7,926,060 B2 | 4/2011 | Klingman |
| 8,069,447 B2 | 11/2011 | Jacobs et al. |
| 8,078,704 B2 | 12/2011 | Lee |
| 8,166,152 B1 | 4/2012 | Delcheva et al. |
| 8,234,650 B1 | 7/2012 | Eppstein et al. |
| 8,250,559 B2 | 8/2012 | Daynes et al. |
| 8,266,616 B1 | 9/2012 | Jacquot et al. |
| 8,326,876 B1 | 12/2012 | Venkataraman et al. |
| 8,402,525 B1 | 3/2013 | Shah et al. |
| 8,458,717 B1 | 6/2013 | Keagy et al. |
| 8,495,067 B2 | 7/2013 | Ripberger |
| 8,560,699 B1 | 10/2013 | Theimer et al. |
| 8,621,178 B1 | 12/2013 | Lazar |
| 8,656,386 B1 | 2/2014 | Baimetov et al. |
| 8,671,404 B2 | 3/2014 | DeHaan et al. |
| 8,782,762 B2 | 7/2014 | Krishnan et al. |
| 8,813,225 B1 | 8/2014 | Fuller et al. |
| 8,839,426 B1 | 9/2014 | Brueckner et al. |
| 8,898,668 B1 | 11/2014 | Costea et al. |
| 8,898,800 B1 | 11/2014 | Fredinburg et al. |
| 8,904,549 B2 | 12/2014 | Mogaki |
| 8,935,427 B2 | 1/2015 | Outhred et al. |
| 8,959,523 B2 | 2/2015 | Patil et al. |
| 8,977,848 B1 | 3/2015 | Tomlinson et al. |
| 9,154,366 B1 | 10/2015 | Martin et al. |
| 9,197,417 B2 | 11/2015 | Ghanaie-Sichanie et al. |
| 9,274,811 B1 | 3/2016 | Reeves et al. |
| 9,317,706 B2 | 4/2016 | Kaushik et al. |
| 9,325,585 B1 | 4/2016 | Wang et al. |
| 9,338,046 B2 | 5/2016 | Bose et al. |
| 9,442,708 B1 | 9/2016 | Reeves |
| 9,507,587 B2 | 11/2016 | Kirchgaessner et al. |
| 9,667,703 B1 | 5/2017 | Vetter et al. |
| 2001/0047276 A1* | 11/2001 | Eisenhart .............. G06Q 10/10 705/37 |
| 2002/0002635 A1 | 1/2002 | Astala et al. |
| 2002/0066033 A1 | 5/2002 | Dobbins et al. |
| 2002/0087687 A1 | 7/2002 | Zaifman et al. |
| 2002/0147696 A1 | 10/2002 | Acker et al. |
| 2002/0184312 A1 | 12/2002 | Chen et al. |
| 2003/0036919 A1 | 2/2003 | Felt et al. |
| 2003/0046114 A1* | 3/2003 | Davies .................. G06Q 10/10 705/3 |
| 2003/0050932 A1 | 3/2003 | Pace et al. |
| 2003/0172145 A1 | 9/2003 | Nguyen |
| 2003/0229623 A1 | 12/2003 | Chang et al. |
| 2004/0015578 A1 | 1/2004 | Karakashian et al. |
| 2004/0015859 A1 | 1/2004 | Potter et al. |
| 2004/0030627 A1 | 2/2004 | Sedukhin |
| 2004/0068560 A1 | 4/2004 | Oulu et al. |
| 2004/0148569 A1 | 7/2004 | Sengodan |
| 2004/0194066 A1 | 9/2004 | Frey et al. |
| 2004/0215725 A1 | 10/2004 | Love et al. |
| 2004/0255264 A1 | 12/2004 | Simpson |
| 2005/0005200 A1 | 1/2005 | Matena et al. |
| 2005/0022006 A1 | 1/2005 | Bass et al. |
| 2005/0283658 A1 | 1/2005 | Clark et al. |
| 2005/0120160 A1 | 6/2005 | Plouffe et al. |
| 2005/0160434 A1 | 7/2005 | Tan et al. |
| 2005/0177827 A1 | 8/2005 | Fong et al. |
| 2005/0216585 A1 | 9/2005 | Todorova et al. |
| 2005/0216860 A1 | 9/2005 | Petrov et al. |
| 2005/0262507 A1 | 11/2005 | Langen et al. |
| 2005/0273456 A1 | 12/2005 | Revanuru et al. |
| 2005/0273518 A1 | 12/2005 | Patrick et al. |
| 2005/0273667 A1 | 12/2005 | Shrivastava et al. |
| 2005/0273787 A1 | 12/2005 | Kovachka-Dimitrova et al. |
| 2006/0015881 A1 | 1/2006 | Polozoff |
| 2006/0036448 A1 | 2/2006 | Haynie et al. |
| 2006/0036715 A1 | 2/2006 | Ghattu |
| 2006/0036734 A1 | 2/2006 | Breeden et al. |
| 2006/0069791 A1 | 3/2006 | Patrick et al. |
| 2006/0106748 A1 | 5/2006 | Chafle et al. |
| 2006/0195619 A1 | 8/2006 | Arndt et al. |
| 2006/0200800 A1 | 9/2006 | Melby |
| 2006/0206887 A1 | 9/2006 | Dodge et al. |
| 2007/0022203 A1 | 1/2007 | Haberkorn et al. |
| 2007/0044144 A1 | 2/2007 | Knouse et al. |
| 2007/0067435 A1 | 3/2007 | Landis et al. |
| 2007/0143299 A1 | 6/2007 | Huras et al. |
| 2007/0156808 A1 | 7/2007 | Koegel et al. |
| 2007/0168371 A1 | 7/2007 | Bhogal et al. |
| 2007/0208862 A1 | 9/2007 | Fox et al. |
| 2007/0240127 A1 | 10/2007 | Roques et al. |
| 2007/0282879 A1 | 12/2007 | Degenkolb et al. |
| 2008/0071922 A1 | 3/2008 | Chetuparambil et al. |
| 2008/0148254 A1 | 6/2008 | Hofer et al. |
| 2008/0155350 A1 | 6/2008 | Ivanov et al. |
| 2008/0165762 A1 | 7/2008 | Gilfix et al. |
| 2008/0177976 A1 | 7/2008 | Branda et al. |
| 2008/0301627 A1 | 12/2008 | Stark |
| 2008/0320269 A1 | 12/2008 | Houlihan et al. |
| 2009/0019439 A1 | 1/2009 | Kwon et al. |
| 2009/0024851 A1 | 1/2009 | Andrade |
| 2009/0094073 A1 | 4/2009 | Cheung et al. |
| 2009/0116380 A1 | 5/2009 | Santiago et al. |
| 2009/0118839 A1 | 5/2009 | Accapadi et al. |
| 2009/0125612 A1 | 5/2009 | Rabetge et al. |
| 2009/0183168 A1 | 7/2009 | Uchida |
| 2009/0259999 A1 | 10/2009 | Srinivasan |
| 2009/0271696 A1 | 10/2009 | Bailor et al. |
| 2009/0276771 A1 | 11/2009 | Nickolov et al. |
| 2009/0276783 A1 | 11/2009 | Johnson et al. |
| 2009/0300093 A1 | 12/2009 | Griffiths et al. |
| 2009/0307743 A1 | 12/2009 | Azagury et al. |
| 2009/0320045 A1 | 12/2009 | Griffith et al. |
| 2010/0023937 A1 | 1/2010 | Kothari et al. |
| 2010/0138696 A1 | 6/2010 | Dehaan et al. |
| 2010/0176962 A1 | 7/2010 | Yossef |
| 2010/0191843 A1 | 7/2010 | Bohm |
| 2010/0251002 A1 | 9/2010 | Sivasubramanian et al. |
| 2010/0274910 A1 | 10/2010 | Ghanaie-Sichanie et al. |
| 2010/0325624 A1 | 12/2010 | Bartolo et al. |
| 2010/0333060 A1 | 12/2010 | Kirchgaessner et al. |
| 2011/0022694 A1 | 1/2011 | Dalal et al. |
| 2011/0047453 A1 | 2/2011 | Catalahana et al. |
| 2011/0125979 A1 | 5/2011 | Kancharla et al. |
| 2011/0137953 A1 | 6/2011 | Bobick et al. |
| 2011/0138374 A1 | 6/2011 | Pal |
| 2011/0145794 A1 | 6/2011 | Gerginov et al. |
| 2011/0161949 A1 | 6/2011 | Kodaka |
| 2011/0185064 A1 | 7/2011 | Head et al. |
| 2011/0213870 A1 | 9/2011 | Cai et al. |
| 2011/0265147 A1 | 10/2011 | Liu |
| 2011/0265168 A1 | 10/2011 | Lucovsky et al. |
| 2011/0289509 A1 | 11/2011 | Kothari et al. |

(56) References Cited

U.S. PATENT DOCUMENTS

| | | |
|---|---|---|
| 2011/0320520 A1 | 12/2011 | Jain |
| 2012/0042198 A1* | 2/2012 | Han .................. H04L 41/0654 714/4.21 |
| 2012/0047239 A1 | 2/2012 | Donahue et al. |
| 2012/0054720 A1 | 3/2012 | Klein et al. |
| 2012/0054732 A1 | 3/2012 | Jain et al. |
| 2012/0072597 A1 | 3/2012 | Teather et al. |
| 2012/0096521 A1 | 4/2012 | Peddada |
| 2012/0102480 A1 | 4/2012 | Hopmann et al. |
| 2012/0110566 A1 | 5/2012 | Park |
| 2012/0110574 A1 | 5/2012 | Kumar |
| 2012/0124353 A1 | 5/2012 | Rehman |
| 2012/0131101 A1 | 5/2012 | Said et al. |
| 2012/0144044 A1 | 6/2012 | Verma |
| 2012/0147894 A1 | 6/2012 | Mulligan et al. |
| 2012/0150912 A1 | 6/2012 | Ripberger |
| 2012/0166488 A1 | 6/2012 | Kaushik et al. |
| 2012/0167081 A1 | 6/2012 | Sedayao et al. |
| 2012/0167094 A1 | 6/2012 | Suit |
| 2012/0179646 A1 | 7/2012 | Hinton et al. |
| 2012/0215775 A1 | 8/2012 | Allen et al. |
| 2012/0221694 A1 | 8/2012 | Darcy |
| 2012/0254266 A1 | 10/2012 | Printezis et al. |
| 2012/0254331 A1 | 10/2012 | Chuan et al. |
| 2012/0254445 A1 | 10/2012 | Kawamoto et al. |
| 2012/0324069 A1* | 12/2012 | Nori .................. G06F 9/5066 709/222 |
| 2013/0007891 A1 | 1/2013 | Mogaki |
| 2013/0019253 A1 | 1/2013 | Joseph et al. |
| 2013/0036400 A1 | 2/2013 | Bak et al. |
| 2013/0262689 A1 | 3/2013 | Schmidt et al. |
| 2013/0086235 A1 | 4/2013 | Ferris |
| 2013/0103639 A1 | 4/2013 | Greenberg et al. |
| 2013/0104150 A1 | 4/2013 | Rdzak et al. |
| 2013/0117289 A1 | 5/2013 | Fischer et al. |
| 2013/0132458 A1 | 5/2013 | Little |
| 2013/0151683 A1 | 6/2013 | Jain et al. |
| 2013/0160115 A1 | 6/2013 | Venkataramanappa et al. |
| 2013/0204917 A1 | 8/2013 | Wang et al. |
| 2013/0212279 A1 | 8/2013 | Dutta et al. |
| 2013/0212576 A1 | 8/2013 | Huang et al. |
| 2013/0226985 A1 | 8/2013 | Dixon et al. |
| 2013/0232191 A1 | 9/2013 | Cheng et al. |
| 2013/0232497 A1 | 9/2013 | Jalagam et al. |
| 2013/0232498 A1 | 9/2013 | Mangtani et al. |
| 2013/0268920 A1 | 10/2013 | Ursal et al. |
| 2013/0295976 A1 | 10/2013 | Dawson et al. |
| 2013/0297801 A1 | 11/2013 | Guest et al. |
| 2013/0304788 A1 | 11/2013 | DeLuca et al. |
| 2013/0326506 A1 | 12/2013 | McGrath et al. |
| 2013/0326507 A1 | 12/2013 | McGrath et al. |
| 2013/0332577 A1 | 12/2013 | Nakil et al. |
| 2013/0339400 A1 | 12/2013 | Pflughoeft |
| 2013/0339470 A1 | 12/2013 | Jeswani et al. |
| 2014/0006626 A1 | 1/2014 | Breiter et al. |
| 2014/0013325 A1 | 1/2014 | Shimoni et al. |
| 2014/0033268 A1 | 1/2014 | Julisch et al. |
| 2014/0047439 A1 | 2/2014 | Levy et al. |
| 2014/0068207 A1 | 3/2014 | Aslot et al. |
| 2014/0068568 A1 | 3/2014 | Wisnovsky |
| 2014/0075019 A1 | 3/2014 | Mordani et al. |
| 2014/0075021 A1 | 3/2014 | Revanuru |
| 2014/0075029 A1 | 3/2014 | Lipchuk et al. |
| 2014/0075030 A1 | 3/2014 | Wang et al. |
| 2014/0075520 A1 | 3/2014 | Subramanian et al. |
| 2014/0075565 A1 | 3/2014 | Srinivasan et al. |
| 2014/0082470 A1 | 3/2014 | Trebas et al. |
| 2014/0089928 A1 | 3/2014 | Stern et al. |
| 2014/0123316 A1 | 5/2014 | Leggette et al. |
| 2014/0136688 A1 | 5/2014 | Kopri et al. |
| 2014/0143276 A1 | 5/2014 | Rogers et al. |
| 2014/0149361 A1 | 5/2014 | Hosey |
| 2014/0149980 A1 | 5/2014 | Vittal et al. |
| 2014/0149983 A1 | 5/2014 | Bonilla et al. |
| 2014/0164933 A1 | 6/2014 | Eberlein et al. |
| 2014/0189681 A1 | 7/2014 | Bryan et al. |
| 2014/0244585 A1 | 8/2014 | Sivasubramanian et al. |
| 2014/0278641 A1 | 9/2014 | Kleehammer et al. |
| 2014/0280306 A1 | 9/2014 | Juillard |
| 2014/0280595 A1 | 9/2014 | Mani et al. |
| 2014/0280975 A1 | 9/2014 | Mordani et al. |
| 2014/0297868 A1 | 10/2014 | Ennaji et al. |
| 2014/0310287 A1 | 10/2014 | Bruso et al. |
| 2014/0331297 A1 | 11/2014 | Innes et al. |
| 2014/0344395 A1 | 11/2014 | Alexander |
| 2014/0359126 A1 | 12/2014 | Breternitz et al. |
| 2014/0359552 A1 | 12/2014 | Misra et al. |
| 2015/0006650 A1 | 1/2015 | Basavanna et al. |
| 2015/0089031 A1 | 3/2015 | Kalali |
| 2015/0095917 A1 | 4/2015 | Challenger et al. |
| 2015/0096011 A1 | 4/2015 | Watt |
| 2015/0106521 A1 | 4/2015 | Cao et al. |
| 2015/0207758 A1 | 7/2015 | Mordani et al. |
| 2015/0296030 A1 | 10/2015 | Maes et al. |
| 2015/0304389 A1 | 10/2015 | Chiussi et al. |
| 2015/0370608 A1 | 12/2015 | Dipol et al. |
| 2015/0372883 A1 | 12/2015 | Lam et al. |
| 2015/0372887 A1 | 12/2015 | Inamdar et al. |
| 2015/0372936 A1 | 12/2015 | Kasso et al. |
| 2015/0372937 A1 | 12/2015 | Lai et al. |
| 2015/0372938 A1 | 12/2015 | Patel et al. |
| 2015/0372941 A1* | 12/2015 | Patel .................. H04L 47/78 709/226 |
| 2015/0373097 A1 | 12/2015 | Konkus et al. |
| 2015/0373098 A1 | 12/2015 | Mordani et al. |
| 2015/0373099 A1 | 12/2015 | Dipol et al. |
| 2015/0373117 A1 | 12/2015 | Gleyzer et al. |
| 2015/0381453 A1* | 12/2015 | Skjolsvold .......... H04L 43/0876 709/224 |
| 2016/0013983 A1 | 1/2016 | Lu et al. |
| 2016/0014038 A1 | 1/2016 | Thyagarajan et al. |
| 2016/0014191 A1 | 1/2016 | Liu et al. |
| 2016/0014212 A1 | 1/2016 | Zhang et al. |
| 2016/0020949 A1 | 1/2016 | Mares et al. |
| 2016/0020965 A1 | 1/2016 | Sakata et al. |
| 2016/0057041 A1 | 2/2016 | Gupta et al. |
| 2016/0088180 A1 | 3/2016 | Felts et al. |
| 2016/0092197 A1 | 3/2016 | Kuchibhotla et al. |
| 2016/0092278 A1 | 3/2016 | Quinn et al. |
| 2016/0092319 A1 | 3/2016 | Parkinson et al. |
| 2016/0092342 A1 | 3/2016 | Inamdar et al. |
| 2016/0094385 A1 | 3/2016 | Bower et al. |
| 2016/0094403 A1 | 3/2016 | Somogyi et al. |
| 2016/0094404 A1 | 3/2016 | Kasso et al. |
| 2016/0094405 A1 | 3/2016 | Barnes et al. |
| 2016/0094406 A1 | 3/2016 | Phan et al. |
| 2016/0094407 A1 | 3/2016 | Parkinson et al. |
| 2016/0094408 A1 | 3/2016 | Segu |
| 2016/0094473 A1 | 3/2016 | Mordani et al. |
| 2016/0094474 A1 | 3/2016 | Sahoo et al. |
| 2016/0094478 A1 | 3/2016 | Quinn et al. |
| 2016/0094484 A1 | 3/2016 | Mordani et al. |
| 2016/0094486 A1 | 3/2016 | Sahoo et al. |
| 2016/0094498 A1 | 3/2016 | Xiao et al. |
| 2016/0094510 A1 | 3/2016 | Xiao et al. |
| 2016/0094583 A1 | 3/2016 | Bower |
| 2016/0094624 A1 | 3/2016 | Mordani et al. |
| 2016/0094625 A1 | 3/2016 | Sengodan et al. |
| 2016/0094626 A1 | 3/2016 | Bajaj et al. |
| 2016/0094627 A1 | 3/2016 | Subramanyam et al. |
| 2016/0094635 A1 | 3/2016 | Kannan et al. |
| 2016/0094852 A1 | 3/2016 | Watson et al. |
| 2016/0142506 A1 | 5/2016 | Sahoo et al. |
| 2016/0231998 A1 | 8/2016 | Islam et al. |
| 2016/0285694 A1 | 9/2016 | Maes |
| 2016/0328268 A1 | 11/2016 | Islam et al. |
| 2017/0017494 A1 | 1/2017 | Patel et al. |
| 2017/0019467 A1 | 1/2017 | Inamdar et al. |
| 2017/0019485 A1 | 1/2017 | Dorr et al. |
| 2017/0034071 A1 | 2/2017 | Sidde et al. |
| 2017/0116041 A1 | 4/2017 | Nanjundaswamy |
| 2017/0118137 A1 | 4/2017 | Nanjundaswamy |
| 2017/0126742 A1 | 5/2017 | Hopkins et al. |
| 2017/0192772 A1 | 7/2017 | Islam et al. |

(56) References Cited

U.S. PATENT DOCUMENTS

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| GB | 2510874 | 8/2014 |
| WO | 0078004 | 12/2000 |
| WO | 2011162991 | 12/2011 |
| WO | 2012054160 | 4/2012 |
| WO | 2013138774 | 9/2013 |
| WO | 2014007813 | 1/2014 |
| WO | 2014039892 | 3/2014 |
| WO | 2014039918 | 3/2014 |
| WO | 2014039919 | 3/2014 |

OTHER PUBLICATIONS

United States Patent and Trademark Office, Office Action dated Apr. 19, 2017 for U.S. Appl. No. 14/747,675, 15 Pages.
United States Patent and Trademark Office, Office Action dated Apr. 20, 2017 for U.S. Appl. No. 14/797,827, 17 Pages.
United States Patent and Trademark Office, Office Action dated Apr. 27, 2017 for U.S. Appl. No. 14/748,094, 12 Pages.
United States Patent and Trademark Office, Office Action dated Apr. 28, 2017 for U.S. Appl. No. 14/748,011, 25 Pages.
United States Patent and Trademark Office, Office Action dated May 19, 2017 for U.S. Appl. No. 14/747,826, 23 Pages.
United States Patent and Trademark Office, Office Action dated Jun. 8, 2017 for U.S. Appl. No. 14/865,733, 8 Pages.
United States Patent and Trademark Office, Office Action dated June 14, 2017 for U.S. Appl. No. 14/864,719, 7 Pages.
United States Patent and Trademark Office, Office Action dated Jun. 15, 2017 for U.S. Appl. No. 14/864,708, 7 Pages.
United States Patent and Trademark Office, Office Action dated Jun. 23, 2017 for U.S. Appl. No. 14/799,273, 14 Pages.
United States Patent and Trademark Office, Office Action dated Jun. 29, 2017 for U.S. Appl. No. 14/865,748, 11 Pages.
United States Patent and Trademark Office, Office Action dated Jun. 30, 2017 for U.S. Appl. No. 14/864,725, 8 Pages.
United States Patent and Trademark Office, Office Action dated Jul. 10, 2017 for U.S. Appl. No. 15/059,193, 14 Pages.
United States Patent and Trademark Office, Office Action dated July 11, 2017 for U.S. Appl. No. 15/059,872, 13 Pages.
United States Patent and Trademark Office, Office Action dated Jul. 13, 2017 for U.S. Appl. No. 14/860,348, 8 Pages.
United States Patent and Trademark Office, Office Action dated Jul. 20, 2017 for U.S. Appl. No. 14/860,513, 9 Pages.
United States Patent and Trademark Office, Office Action dated Jul. 27, 2017 for U.S. Appl. No. 14/748,102, 12 Pages.
United States Patent and Trademark Office, Office Action dated Jul. 28, 2017 for U.S. Appl. No. 14/863,245, 27 Pages.
United States Patent and Trademark Office, Office Action dated July 28, 2017 for U.S. Appl. No. 14/866,601, 10 Pages.
United States Patent and Trademark Office, Office Action dated Aug. 9, 2017 for U.S. Appl. No. 14/747,982, 15 Pages.
United States Patent and Trademark Office, Office Action dated Aug. 10, 2017 for U.S. Appl. No. 14/795,427, 14 Pages.
United States Patent and Trademark Office, Office Action dated Aug. 10, 2017 for U.S. Appl. No. 14/799,250, 8 Pages.
United States Patent and Trademark Office, Office Action dated Aug. 10, 2017 for U.S. Appl. No. 14/865,758, 34 Pages.
United States Patent and Trademark Office, Office Action dated Aug. 11, 2017 for U.S. Appl. No. 14/865,767, 23 Pages.
United States Patent and Trademark Office, Office Action dated Aug. 16, 2017 for U.S. Appl. No. 14/866,618, 14 Pages.
United States Patent and Trademark Office, Office Action dated Aug. 17, 2017 for U.S. Appl. No. 15/064,754, 15 Pages.
United States Patent and Trademark Office, Office Action dated Aug. 18, 2017 for U.S. Appl. No. 14/799,273, 19 Pages.
United States Patent and Trademark Office, Office Action dated Aug. 24, 2017 for U.S. Appl. No. 14/857,451, 8 Pages.
United States Patent and Trademark Office, Office Action dated Aug. 25, 2017 for U.S. Appl. No. 15/403,396, 23 Pages.
United States Patent and Trademark Office, Office Action dated Sep. 12, 2017 for U.S. Appl. No. 14/866,644, 10 Pages.
United States Patent and Trademark Office, Office Action dated Sep. 22, 2017 for U.S. Appl. No. 14/864,723, 8 Pages.
United States Patent and Trademark Office, Office Action dated Sep. 25, 2017 for U.S. Appl. No. 14/864,797, 10 Pages.
United States Patent and Trademark Office, Office Action dated Oct. 6, 2017 for U.S. Appl. No. 14/748,139, 11 Pages.
United States Patent and Trademark Office, Office Action dated Oct. 11, 2017 for U.S. Appl. No. 14/866,515, 12 Pages.
United States Patent and Trademark Office, Office Action dated Oct. 20, 2017 for U.S. Appl. No. 14/748,148, 19 Pages.
United States Patent and Trademark Office, Office Action dated Nov. 3, 2017 for U.S. Appl. No. 14/747,866, 23 Pages.
United States Patent and Trademark Office, Office Action dated Nov. 3, 2017 for U.S. Appl. No. 14/747,853, 25 Pages.
United States Patent and Trademark Office, Office Action dated Nov. 3, 2017 for U.S. Appl. No. 14/866,642, 11 Pages.
United States Patent and Trademark Office, Office Action dated Nov. 3, 2017 for U.S. Appl. No. 14/973,052, 11 Pages.
United States Patent and Trademark Office, Office Action dated Nov. 29, 2017 for U.S. Appl. No. 14/748,094, 15 Pages.
United States Patent and Trademark Office, Office Action dated Nov. 30, 2017 for U.S. Appl. No. 14/868,050, 7 Pages.
United States Patent and Trademark Office, Office Action dated Dec. 13, 2017 for U.S. Appl. No. 14/797,827, 19 Pages.
United States Patent and Trademark Office, Office Action dated Dec. 15, 2017 for U.S. Appl. No. 14/747,675, 15 Pages.
Barreiros, Jorge et al., "A Cover-Based Approach for Configuration Repair", ACM 2014, pp. 157-166, 10 pages.
BEA, "BEA WebLogic Server: Configuring and Managing WebLogic JMS", Version 10.0, Mar. 30, 2007, 142 pages.
Cisco, "Designing Secure Multi-Tenancy into Virtualized Data Centers" 2009 Cisco Systems, Inc., Dec. 7, 2009, 82 pages.
Coward, Danny, Java TM Servlet Specification Version 2.4, Nov. 24, 2003, 330 pages.
D'Ambrosio, Joseph G., et al., "Configuration-Level Hardware/Software Partitioning for Real-Time Embedded Systems", 1994 IEEE, pp. 34-41, 8 pages.
Elmore, et al., Zephyr: Live Migration in Shared Nothing Databases for Elastic Cloud Platforms, Jun. 12, 2011, 12 pages.
European Patent Office, International Search Report and Written Opinion for PCT Application No. PCT/US2015/012268, dated Apr. 24, 2015, 10 pages.
European Patent Office, International Search Report and Written Opinion for PCT Application No. PCT/US2015/052471, dated Dec. 14, 2015, 11 pages.
European Patent Office, International Search Report and Written Opinion for PCT Application No. PCT/US2016/051099, dated Nov. 29, 2016, 12 pages.
Gil, David Sanz, "What's New in WebLogic 12c", http://www.slideshare.net/OracleMKTPR20/novedades-de-weblogic-12cdavid-sanz, Jun. 17, 2014, pp. 1-42, 42 pages.
IBM, "Websphere Application Server V6.1: System Management and Configuration", 2006, pp. 741-794, 53 pages.
International Search Report and Written Opinion for PCT Application No. PCT/US2015/037270, dated Sep. 23, 2015, 9 pages.
International Search Report and Written Opinion for PCT Application No. PCT/US2015/037264, dated Sep. 24, 2015, 11 pages.
International Search Report and Written Opinion for PCT Application No. PCT/US2015/037265, dated Sep. 24, 2015, 10 pages.
International Search Report and Written Opinion for PCT Application No. PCT/US2015/037267, dated Sep. 24, 2015, 13 pages.
International Search Report and Written Opinion for PCT Application No. PCT/US2015/037403, dated Sep. 28, 2015, 12 pages.

(56) References Cited

OTHER PUBLICATIONS

International Search Report and Written Opinion for PCT Application No. PCT/US2015/040407, dated Sep. 28, 2015, 10 pages.
International Search Report and Written Opinion for PCT Application No. PCT/US2015/037262, dated Oct. 15, 2015, 13 pages.
International Search Report and Written Opinion for PCT Application No. PCT/US2015/040048, dated Oct. 15, 2015, 12 pages.
International Search Report and Written Opinion for PCT Application No. PCT/US2015/052057, dated Dec. 8, 2015, 13 pages.
International Search Report and Written Opinion for PCT Application No. PCT/US2015/052459, dated Jan. 4, 2016, 13 pages.
International Search Report and Written Opinion for PCT Application No. PCT/US2015/052462, dated Jan. 5, 2016, 14 pages.
International Search Report and Written Opinion for PCT Application No. PCT/US2015/052469, dated Jan. 19, 2016, 14 pages.
"Introducing WebLogic Server 12c", Jan. 2012, Oracle, pp. 1-16, 16 pages.
Kang, Junbin et al. "MultiLanes: Providing Virtualized Storage for OS-Level Virtualization on Many Cores", 12th USENIX Conference on File and Storage Technologies (FAST '14), Feb. 17-20, 2014, Santa Clara, CA, 14 pages.
Leibert, Florian et al., "Automatic Management of Partitioned, Replicated Search Service", Copyright 2011, ACM, 8 pages.
"Multitasking without Compromise: a Virtual Machine Evolution", by Grzegorz Czajkowski and Laurent Daynes of Sun Microsystems, OOPSLA 01 Tampa, Florida, USA, ACM, 2001, 14 pages.
"Oracle Enterprise Manager Concepts, 11g Release 11.1.0.1", Oracle, Apr. 2010, 260 pages.
"Oracle Multitenant", An Oracle White Paper, Jun. 2013, http://www.oracle.com/technetwork/database/multitenant-wp-12c-1949736.pdf, 53 pages.
Periasamy, "Performance Optimization in Cloud Computing Environment", Oct. 11, 2012, 6 pages.
Porter, Joseph et al., "Partition Configuration for Real-Time Systems with Dependencies", 2013, ACM, pp. 87-96, 10 pages.
Sorenson, et al., "Reuse and Combination with Package Templates", ECOOP 2010, ACM, pp. 1-5, 5 pages.
Sun Microsystems, Inc., Java Naming and Directory Interface Application Programming Interface (JNDI API), Jul. 14, 1999, 76 pages.
Tatsubori, et al., "HTML Templates that Fly", WWW 2009, ACM, pp. 951-960, 10 pages.
United States Patent and Trademark Office, Office Action dated Dec. 1, 2015 for U.S. Appl. No. 14/864,695, 28 Pages.
United States Patent and Trademark Office, Third-Party Submission Under 37 C.F.R. 1.290 Concise Description of Relevance dated Apr. 22, 2016 for U.S. Appl. No. 14/866,644, 9 Pages.
United States Patent and Trademark Office, Office Action dailed Jul. 5, 2016 for U.S. Appl. No. 14/748,142, 12 Pages.
United States Patent and Trademark Office, Office Action dated Aug. 25, 2016 for U.S. Appl. No. 14/747,718, 28 Pages.
United States Patent and Trademark Office, Office Action dated Aug. 26, 2016 for U.S. Appl. No. 14/860,348, 7 Pages.
United States Patent and Trademark Office, Office Action dated Oct. 5, 2016 for U.S. Appl. No. 14/865,896, 11 Pages.
United States Patent and Trademark Office, Notice of Allowance dated Oct. 11, 2016 for U.S. Appl. No. 14/747,778, 21 Pages.
United States Patent and Trademark Office, Office Action dated Dec. 16, 2016 for U.S. Appl. No. 14/748,148, 12 Pages.
United States Patent and Trademark Office, Office Action dated Dec. 22, 2016 for U.S. Appl. No. 14/866,591, 12 Pages.
United States Patent and Trademark Office, Office Action dated Dec. 30, 2016 for U.S. Appl. No. 14/860,348, 9 Pages.
United States Patent and Trademark Office, Office Action dated Jan. 23, 2017 for U.S. Appl. No. 14/748,146, 12 Pages.
United States Patent and Trademark Office, Office Action dated Feb. 2, 2017 for U.S. Appl. No. 14/747,718, 31 Pages.
United States Patent and Trademark Office, Office Action dated Feb. 17, 2017 for U.S. Appl. No. 14/866,644, 12 Pages.
United States Patent and Trademark Office, Office Action dated Feb. 23, 2017 for U.S. Appl. No. 14/747,982, 11 Pages.
United States Patent and Trademark Office, Office Action dated Mar. 1, 2017 for U.S. Appl. No. 14/748,142, 17 Pages.
United States Patent and Trademark Office, Office Action dated Mar. 10, 2017 for U.S. Appl. No. 14/747,866, 21 Pages.
Chinese Patent Office, Office Action dated Jul. 20, 2018, 8 pages.

\* cited by examiner

SYSTEM AND METHOD FOR TRAFFIC DIRECTOR SUPPORT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional application titled "SYSTEM AND METHOD FOR TRAFFIC DIRECTOR SUPPORT IN A MULTITENANT APPLICATION SERVER ENVIRONMENT", Application No. 62/198,964, filed Jul. 30, 2015; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for traffic director support in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for traffic director support in a multitenant application server environment. An exemplary method can provide one or more partitions, wherein each partition provides an administrative and runtime subdivision of the domain, one or more resource groups, wherein each of the one or more resource groups is associated with a partition of the one or more partition, one or more virtual targets, and an instance of a traffic director comprising a configuration. The method can target each of the one or more partitions and the one or more resource groups to a virtual target of the one or more virtual targets. The method can also configure the configuration of the traffic director, wherein the instance of a traffic director provides load balancing among one or more servers of a server pool.

DETAILED DESCRIPTION

In accordance with an embodiment, described herein is a system and method for traffic director support in a multi-tenant application server environment. An exemplary method can provide one or more partitions, wherein each partition provides an administrative and runtime subdivision of the domain, one or more resource groups, wherein each of the one or more resource groups is associated with a partition of the one or more partition, one or more virtual targets, and an instance of a traffic director comprising a configuration. The method can target each of the one or more partitions and the one or more resource groups to a virtual target of the one or more virtual targets. The method can also configure the configuration of the traffic director, wherein the instance of a traffic director provides load balancing among one or more servers of a server pool.

Application Server (e.g., Multi-Tenant, MT) Environment

Figure 1:
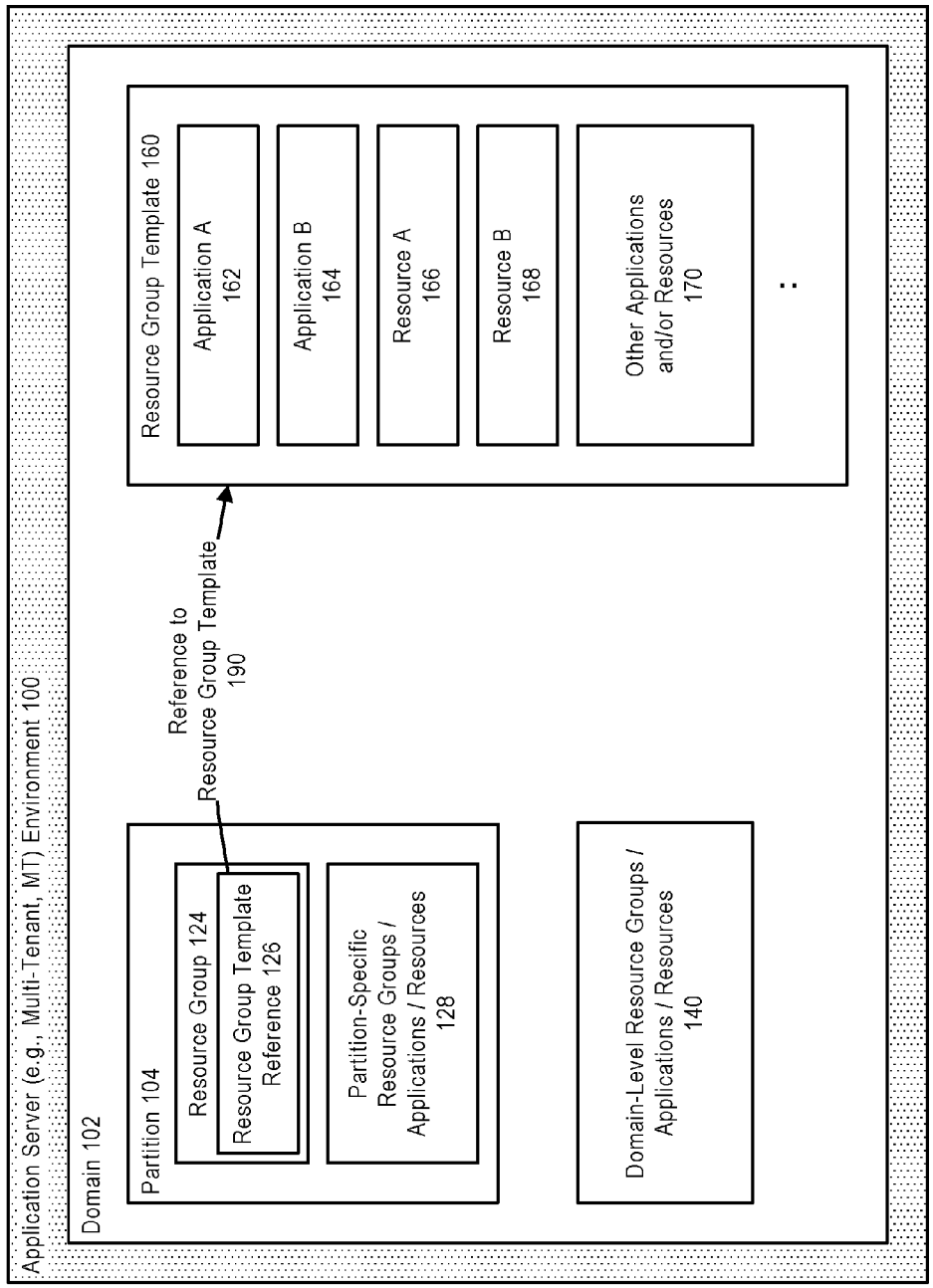
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
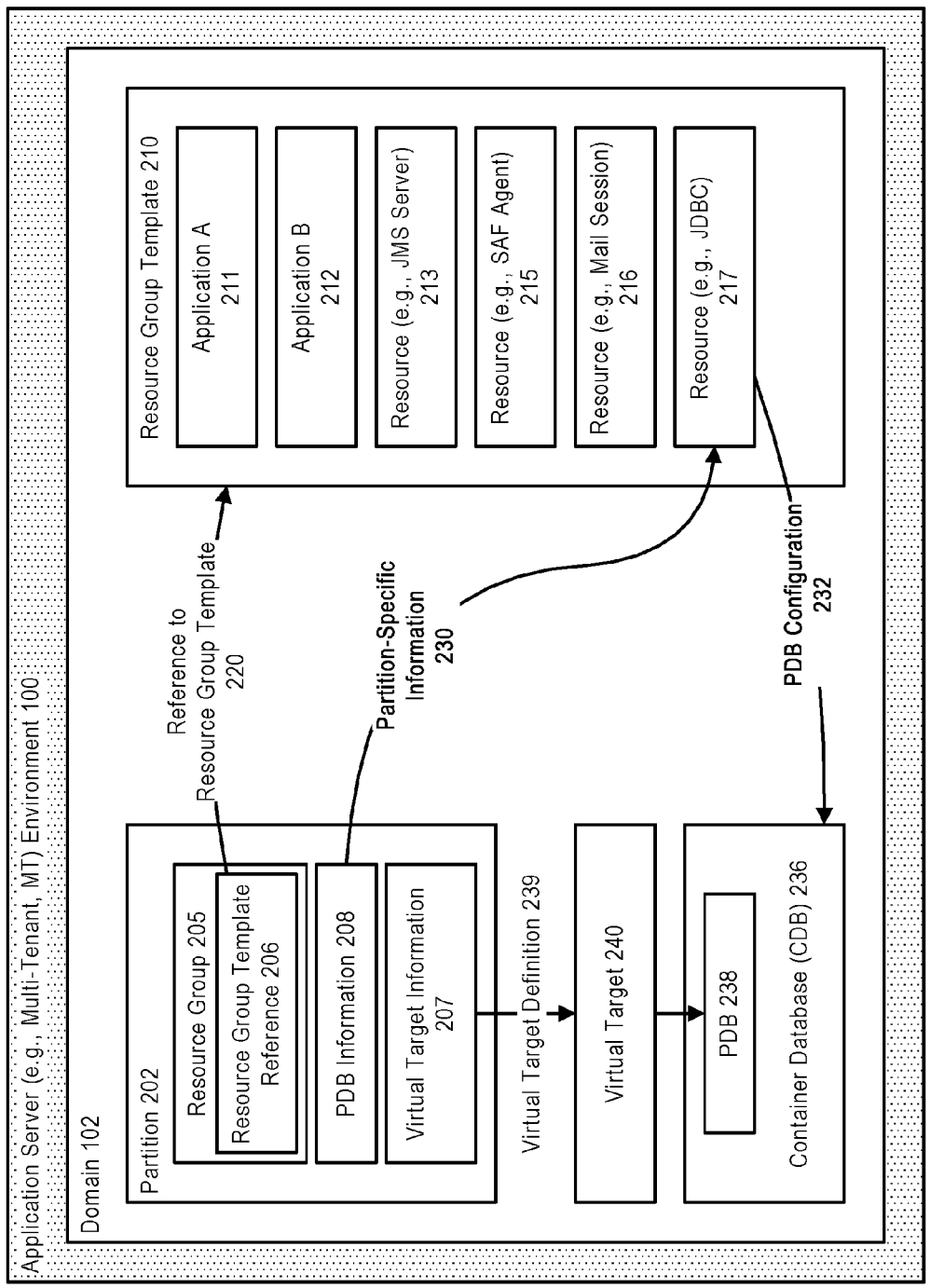
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
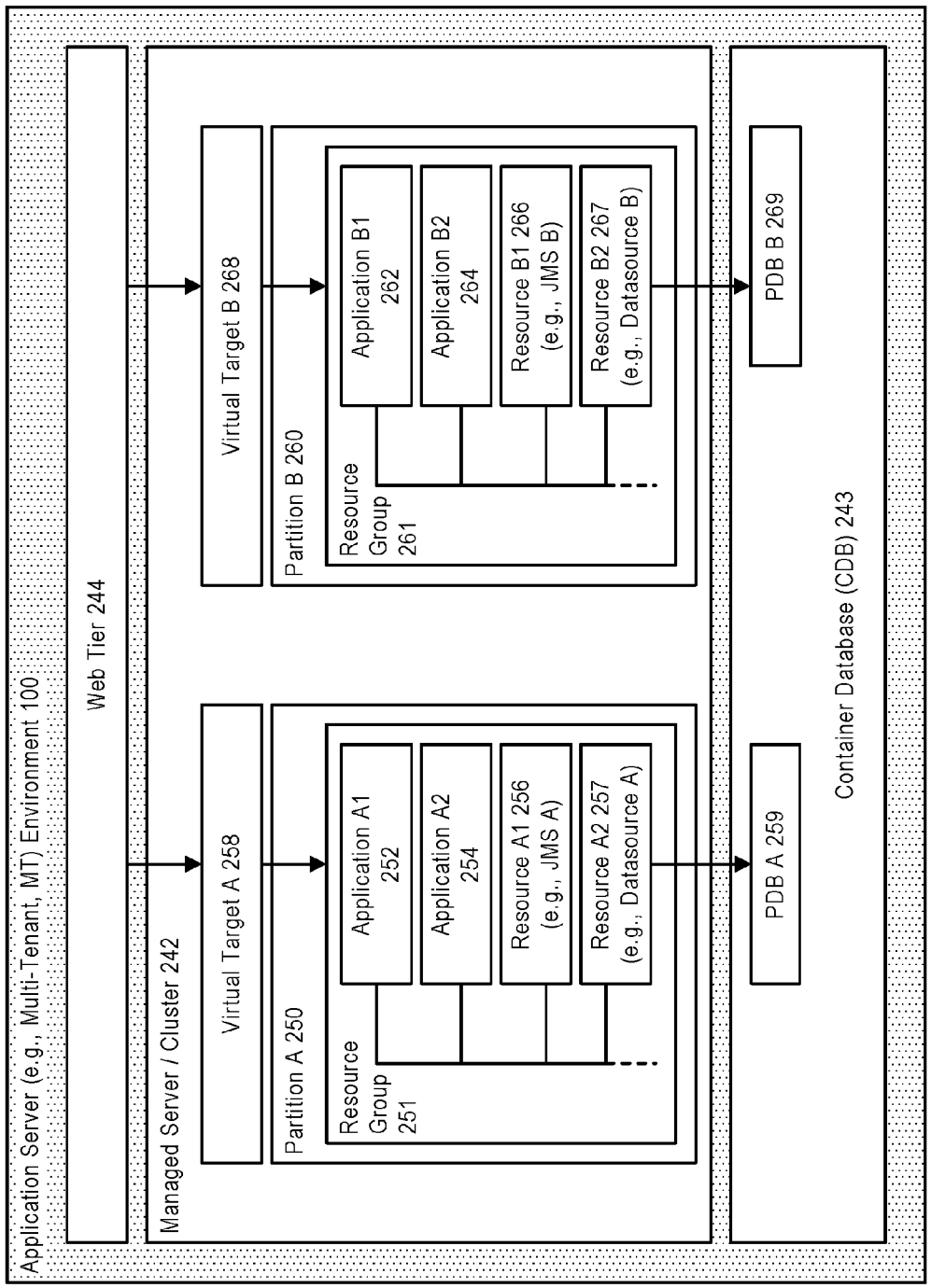
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
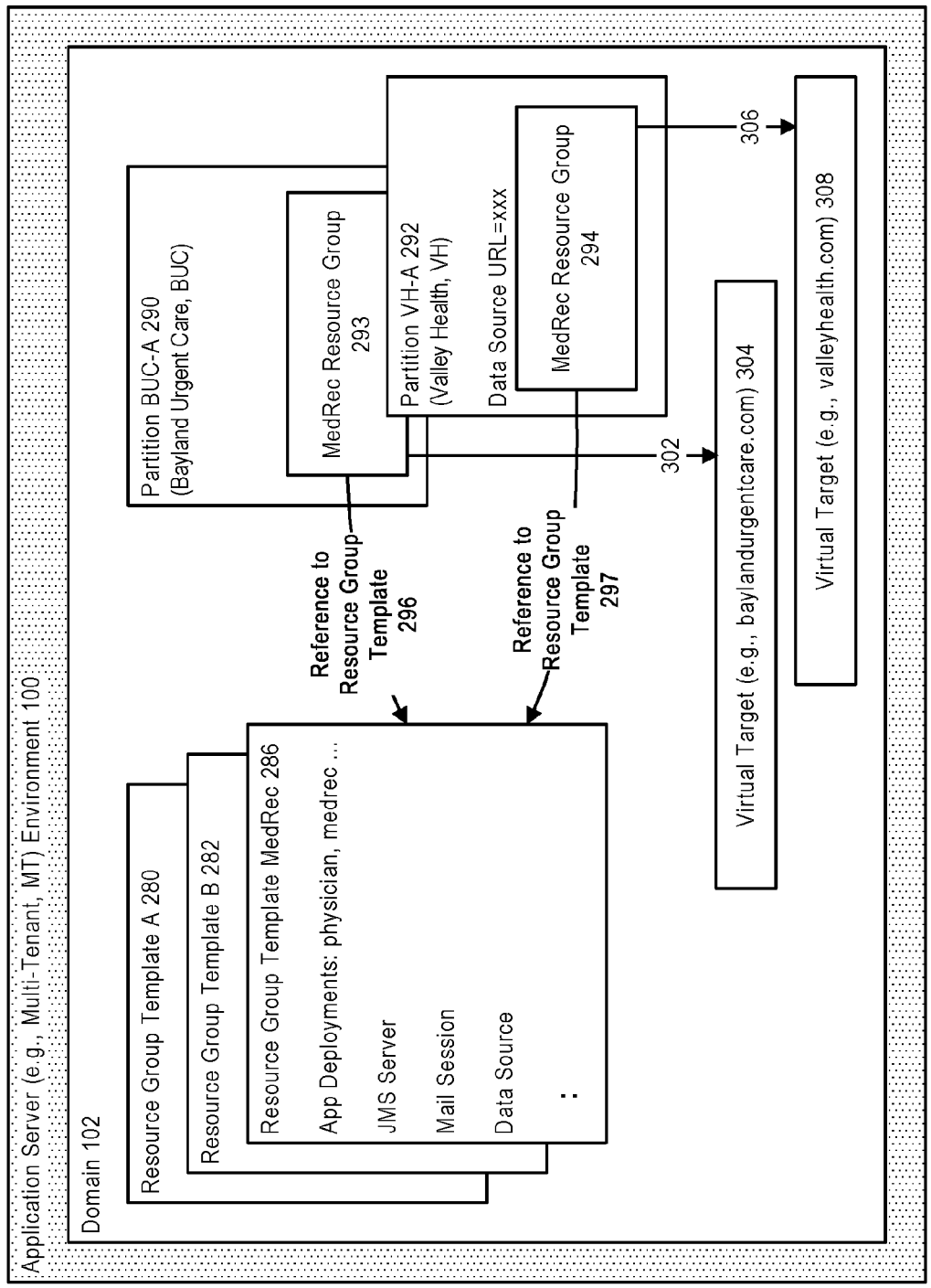
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
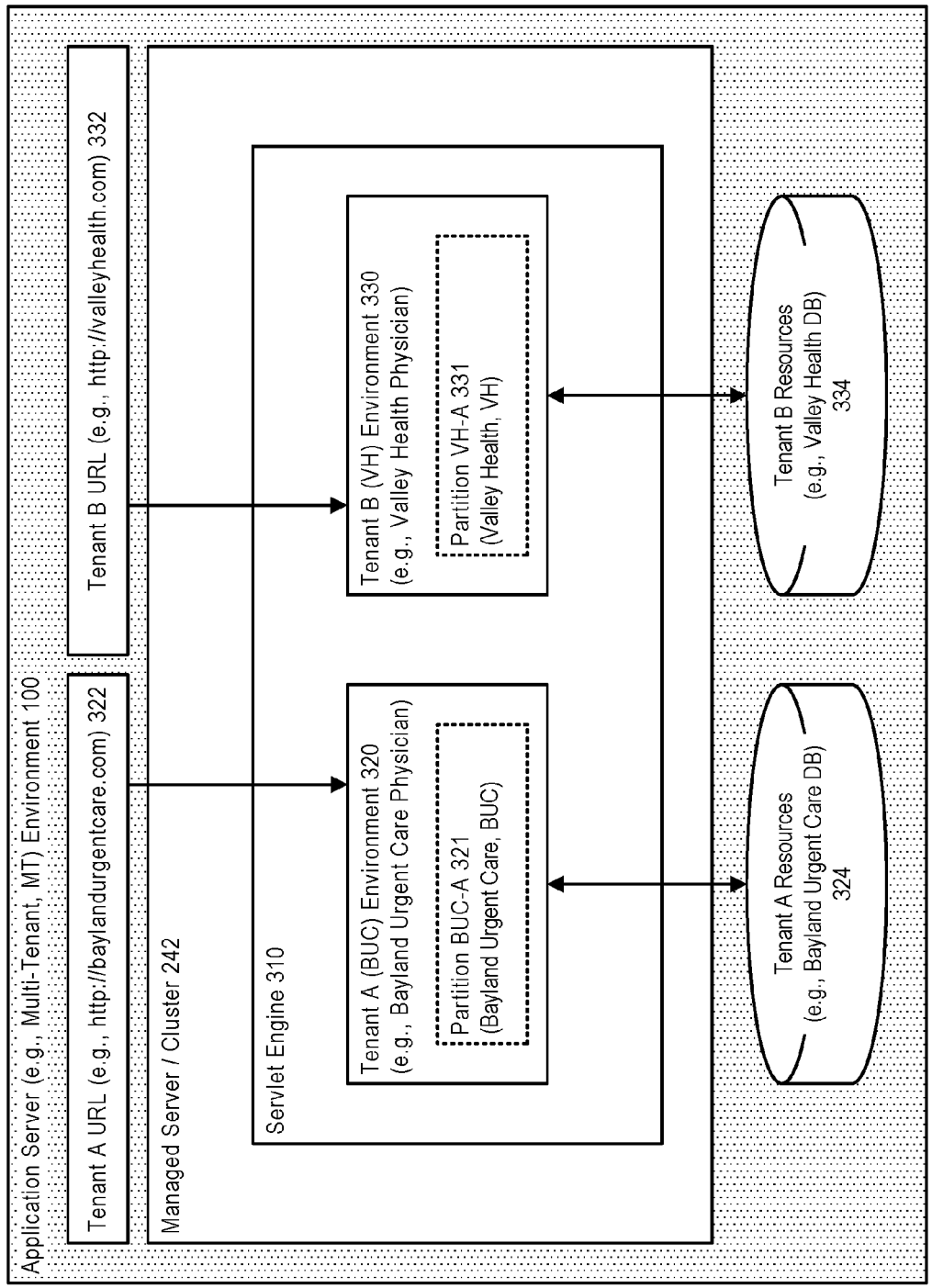
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Traffic Director Support

In accordance with an embodiment, described herein is a system and method for traffic director support in a multi-tenant application server environment. A method can provide, at one or more computers, including an application server environment executing thereon, a plurality of deployable resources which can be used within the application server environment, one or more resource group templates, which define groupings of deployable resources within a domain, and one or more partitions, wherein each partition provides an administrative and runtime subdivision of the domain; associating one or more partitions and resource group templates with a tenant, for use by the tenant. The method can support one or more instances of a traffic director, the traffic director providing load balancing among one or more servers.

In accordance with an embodiment, a traffic director can serve as a load balancer and a router. The traffic director can be made up of an administration server, instances, and Failover Groups. Because today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. A traffic director, such as Oracle™ Traffic Director, can provide such load balancing. The Oracle™ Traffic Director is a software level load balancer, used to load-balance incoming HTTP connections among servers that host the actual content.

In accordance with an embodiment, the traffic director can server as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director can include one or more traffic director instances defined by a configuration, wherein the configuration provides information about various elements of that instance, such as listeners, origin servers, failover groups, and logs.

In accordance with an embodiment, a traffic director supports functionalities such as load balancing, 503 header detection, dynamic discovery, and health check.

In accordance with an embodiment, in a typical deployment scenario, a traffic director front ends the multitenant application server environment. So, whenever a partition within multitenant application server environment partition is created/updated/deleted, then the corresponding traffic director configuration can be created/updated/deleted automatically. To achieve this, the traffic director can utilize a plugin based mechanism provided by a lifecycle infrastructure.

Traffic Director Support—Targeting

Figure 6:
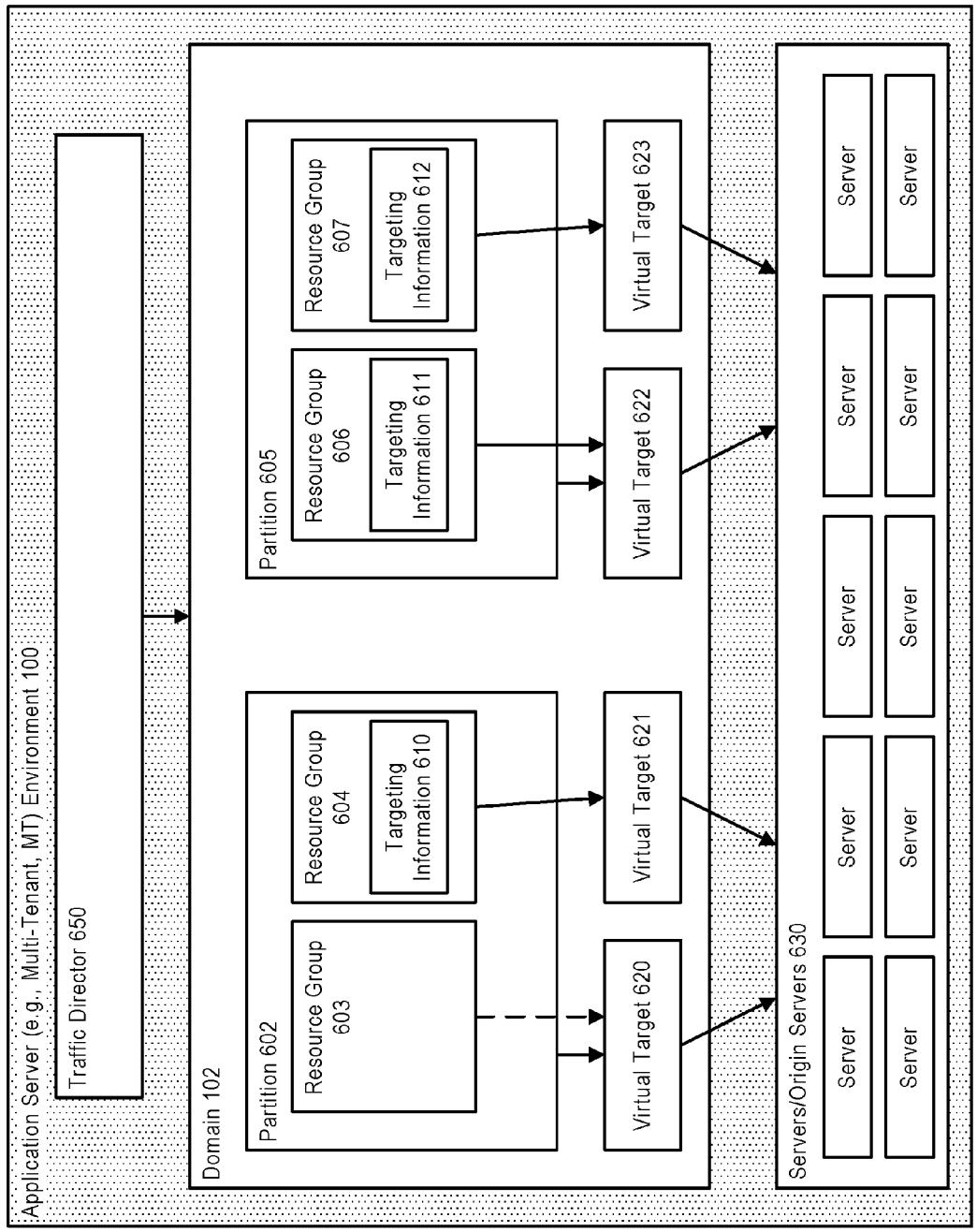
FIG. 6 illustrates traffic director support within a multi-tenant application server environment, in accordance with an embodiment.

FIG. 6 illustrates traffic director support within a multitenant application server environment, in accordance with an embodiment. More specifically, FIG. 6 illustrates targeting in a multitenant application server environment.

In accordance with an embodiment, an application server (e.g., MT application server) environment 100 can comprise a domain 102, a number of servers/origin servers 630, and can front end a traffic director 650. The domain 102 can contain a number of partitions, such as partition 602 and partition 605. Each of the partitions, in turn, can contain a number of resource groups, e.g., resource groups 603, 604, 606, and 607. Each resource group can, optionally, contain targeting information, such as targeting information 610, 611, and 612. As well, each partition and resource group can be associated with one or more virtual targets, such as virtual target 620, 621, 622, and 623. The traffic director 650 can be responsible for directing traffic to the virtual targets.

In accordance with an embodiment, each partition has one or more resource groups. A resource group can be a collection of applications and application resources (e.g., JNDI, JMS, JDBC, etc.). A partition or its resource groups can be independently associated with a virtual target. This can be referred to as "targeting."

In accordance with an embodiment, a virtual target can comprise of an optional hostname, an optional URI, and a runtime target (a cluster or a list of managed servers). Any partition or resource group that is associated with a virtual target is accessed by the hostname and/or URI and is running on the managed servers of the cluster or the specified list of managed servers.

In accordance with an embodiment, a virtual target associated with the partition can be referred to as a default target. Any resource group that is not explicitly associated with a virtual target will be associated with the default target. For example, in referring to FIG. 6, virtual target 620 is the default target for partition 602. Because resource group 603 is not associated with any targeting information, it is associated with the default virtual target 620 (shown as a dashed line in the Figure).

In accordance with an embodiment, the various virtual targets, and in turn those partitions and resource groups associated with those virtual targets, can be served by groups of managed servers, which can be referred to as clusters. In some embodiments, one cluster may target.

Figure 7:
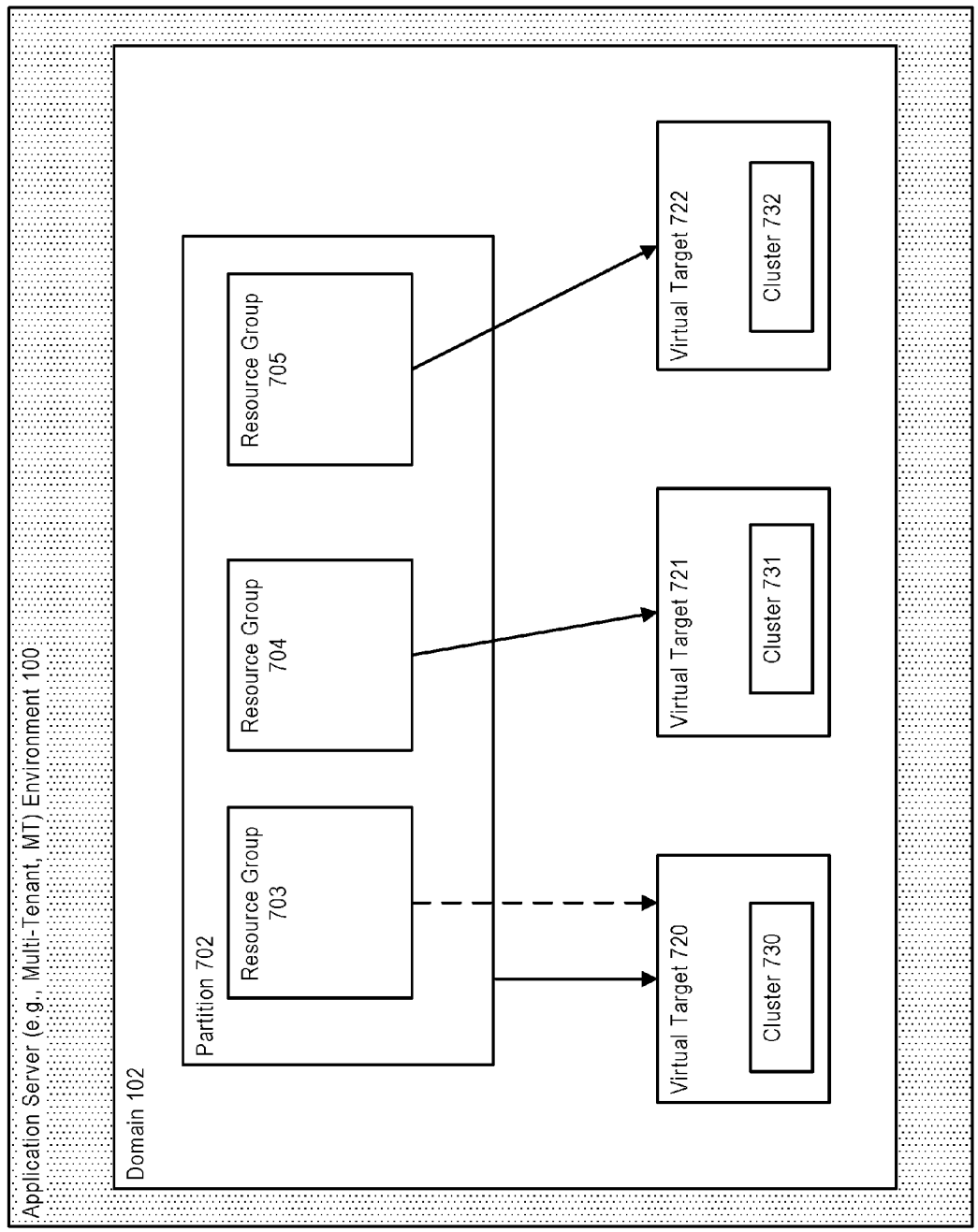
FIG. 7 further illustrates traffic director support in a multitenant application server environment, in accordance with an embodiment.

FIG. 7 further illustrates traffic director support in a multitenant application server environment, in accordance with an embodiment. In the depicted example, virtual target 720 can be the default target. All resource groups that are not explicitly targeted will be targeted to the default virtual target 720. This means that resource group 703, which is not explicitly targeted to a virtual target is targeted to the default virtual target.

As an example, in accordance with an embodiment, if resource group 703 has a context of /foo, and the default virtual target has a URI of http://www.mycompany.com, then the application of resource group 703 can be accessed as, http://www.mycompany.com/foo, and can be served by the managed servers of the cluster 730 (which virtual target 720 is associated with).

In accordance with an embodiment, if an application in resource group 704 has a context of /bar, and is targeted explicitly to virtual target 721 (which can have a URI of http://hr.mycompany.com), then the /bar application can be accessed as http://hr.mycompany.com/bar. In turn, the application of resource group 704 can be served by the managed servers of the cluster 731 (which virtual target 721 is associated with).

In accordance with an embodiment, if an application in resource group 705 has a context of /baz, and is targeted explicitly to virtual target 722, which does not have a URI/virtual host name specified. Because of this, /baz can be accessed directly via the port of the server it is running on (e.g., vm3.us.oracle.com:80/baz), where vm3.us.oracle.com is the hostname of the machine where the managed server in cluster 732 is running on. Typically the cluster is front ended by a load balancer (e.g., traffic director), in which case vm3.us.oracle.com can be the hostname of the machine where the load balancer instance is running on.

In accordance with an embodiment, each cluster can map to an server pool (e.g., an origin server pool).

In accordance with an embodiment, the hostname of a virtual target that is associated with a partition and/or resource group can map to a virtual server. This can provide for flexibility to model various use cases, such as SaaS, Consolidation, Regional/Geographic.

In accordance with an embodiment, each partition or resource group can map to a route within the virtual server corresponding to the hostname of the virtual target.

In accordance with an embodiment, a traffic director can additionally serve as a load balancer for an application server environment. The traffic director can terminate security (e.g., SSL, secure sockets layer) at a partition level. Each partition may have its own certificates that should be served to the clients of that partition. A traffic director can use SNI (server name identification) to support per-partition server certificates with a caveat that partitions or resource groups that are the targeted to the same host name can serve the same server certificate.

In accordance with an embodiment, if high available needs to be configured at the traffic director, then the hostname of the partitions or resource groups can map to the virtual IP of a failover group.

In accordance with an embodiment, a traffic director can support a separate access log for each partition in the application server environment.

In accordance with an embodiment, a traffic director can be administered alongside and in conjunction with the administration of the multitenant application server environment, such that whenever the application server environment is configured, a corresponding configuration change also takes place with the traffic director. For example, a multitenant application server environment can be configured to add or remove partitions. In such a case, a lifecycle object can similarly configure a traffic director.

In accordance with an embodiment, a single traffic director setup can be used for front ending multiple domains in a multitenant application server environment. In such situations a traffic director console or traffic director commands can be used to perform advanced/fine-grained operations that are traffic director specific.

Traffic Director Support—Partitions

In accordance with an embodiment, multiple traffic director artifacts can be used to map a partition or a resource group (e.g., a virtual server, route and an origin server pool). Moreover, a method is provided to map a tuple—virtual server, route and origin server pool—to a specified partition or a resource group.

In accordance with an embodiment, a traffic director partition object can be used to group the tuple to a partition or a resource group. The traffic director partition can simply be a grouping with the same name as the partition and/or the resource group. A lifecycle of a traffic director partition and its corresponding artifacts can be linked to the lifecycle of the partition. There can optionally be no active management of traffic director partition via traffic director administration interfaces (e.g., traffic director console).

In accordance with an embodiment, a traffic director console can provide a partition table which can include a list of traffic director partitions to identify the traffic director artifacts that are mapped to partitions and/or resource groups. The listing of traffic director partitions can also be accessible a scripting tool, such as Web Logic Scripting Tool.

In accordance with an embodiment, a pseudo snippet for default target and resource group targeting follows:

```
<?xml version="1.0" encoding="UTF-8"?>
<server>
    ...
    <partition>
        <name>soda.com</name>
        <access-log-name>soda.com</access-log-name>
        <resource-group>
            <name>resource_group_name_1</name>
            <virtual-server-name>opc.com</virtual-server-name>
            <route-name>rg1_route_1</route-name>
        </resource-group>
    </partition>
    ...
</server>
```

In accordance with an embodiment, there can be multiple resource group elements under each partition element. As well, an origin server pool name does not have to be explicitly captured. It instead can be captured in a route association.

Configuring Traffic Director for Partitions

In accordance with an embodiment, provide below is a pseudo snippet of a configuration for a traffic director configuration that can be used when a partition is created within a domain:

```
<access-log>
    <name>soda.com</name>
    ...
</access-log>
<partition>
    <name>soda.com</name>
    <access-log-name>soda.com</access-log-name>
</partition>
```

In accordance with an embodiment, this configuration of a traffic director that corresponds to a partition creation has no functional artifacts (e.g., virtual server, route, origin server pool). These artifacts can be created once a virtual target is associated with the created partition.

In accordance with an embodiment, a traffic director can be further configured when a partition and/or resource group is targeted to a virtual target. In the below pseudo configuration, the hostname of the virtual target can be "www.mycopmany.com", and the URI of the virtual target is "/finance," and the WLS cluster of the virtual is "c1" with 2 managed servers at node1.mycompany.com:4444 and node2.mycompany.com:4444:

```
<access-log>
    <name>soda.com</name>
    ...
</access-log>
<virtual-server>
    <name>vs1</name>
    <host>www.mycompany.com</host>
    <http-listener-name>port-eighty-1s</http-listener-name>
    <object-file>vs1-obj.conf</object-file>
...
</virtual-server>
<origin-server-pool>
    <name>c1</name>
    <health-check>
        <dynamic-discovery>false</dynamic-discovery>
        ...
    </health-check>
    ...
    <origin-server>
        <host>node1.mycompany.com</host>
        <port>4444</port>
        ...
    </origin-server>
    <origin-server>
        <host>node2.mycompany.com</host>
        <port>4444</port>
        ...
    </origin-server>
<origin-server-pool>
<partition>
    <name>soda.com</name>
    <access-log-name>soda.com</access-log-name>
    <resource-group>
        <name>finance-rg</name>
        <virtual-server-name>vs1</virtual-server-name>
        <route-name>route1</route-name>
    </resource-group>
</partition>
<Object name="default">
...
<If uri=~"/finance(|/*)">
NameTrans fn="assign-name" id="route1" name="route1"
</If>
...
</Object>
...
<Object name="route1">
...
Route fn="set-origin-server" origin-server-pool="c1 ...
AddLog fn="flexlog" name="soda.com"
</Object>
...
```

In accordance with an embodiment, a configuration of a traffic director can be further configured when a resource group with a same hostname as a partition is targeted to a different virtual target (e.g., a different URI). Building from the pseudo configuration above, let the URI of the virtual target for the resource group be "/hr".

```
<access-log>
    <name>soda.com</name>
    ...
</access-log>
<virtual-server>
    <name>vs1</name>
```

-continued

```
    <host>www.mycompany.com</host>
    <http-listener-name>port-eighty-1s</http-listener-name>
    <object-file>vs1-obj.conf</object-file>
    ...
</virtual-server>
<origin-server-pool>
    <name>c1</name>
    <health-check>
        <dynamic-discovery>false</dynamic-discovery>
        ...
    </health-check>
    ...
    <origin-server>
        <host>node1.mycompany.com</host>
        <port>4444</port>
        ...
    </origin-server>
    <origin-server>
        <host>node2.mycompany.com</host>
        <port>4444</port>
        ...
    </origin-server>
<origin-server-pool>
<partition>
    <name>soda.com</name>
    <access-log-name>coke.com</access-log-name>
    <resource-group>
    <name>finance-rg</name>
        <virtual-server-name>vs1</virtual-server-name>
        <route-name>route1</route-name>
    </resource-group>
    <resource-group>
        <name>hr-applications</name>
        <virtual-server-name>vs1</virtual-server-name>
        <route-name>route2</route-name>
    </resource-group>
</partition>
<Object name="default">
...
<If uri=~"/finance(|/*)">
NameTrans fn="assign-name" id="route1" name="route1"
</If>
<If uri=~"/hr(|/*)">
NameTrans fn="assign-name" id="route2" name="route2"
</If>
...
</Object>
...
<Object name="route1">
...
Route fn="set-origin-server" origin-server-pool="c1 ...
AddLog fn="flexlog" name="coke.com"
</Object>
<Object name="route2">
...
Route fn="set-origin-server" origin-server-pool="c1 ...
AddLog fn="flexlog" name="coke.com"
</Object>
...
```

In accordance with an embodiment, a configuration of a traffic director can be further configured when a virtual target is removed from a resource group. In such a situation, the resource group related entries can be deleted from the traffic director configuration.

In accordance with an embodiment, a configuration of a traffic director can be further configured when the hostname and the URI of a virtual target are modified.

In accordance with an embodiment, a configuration of a traffic director can be further configured when a hostname has been removed from a virtual target. In such a situation, the properties and directives of the route object can be maintained, excepting that the route name which can be modified to avoid namespace clashes.

In accordance with an embodiment, a configuration of a traffic director can be further configured when a URI has been removed from a virtual target. When the URI is removed from a virtual target, and since there is not hostname for the partition the partition entries will be removed. Note that at least one of hostname or URI is required to be able to front end the partition/resource group. Otherwise, the partition/resource group is not accessible.

In accordance with an embodiment, a configuration of a traffic director can be further configured when a cluster of the virtual target is removed. The configuration in such a case is similar to that of removing both the hostname and URI in that the corresponding entries can be removed.

In accordance with an embodiment, a configuration of a traffic director can be further configured when a partition is deleted.

Traffic Director—Partition Administration

In accordance with an embodiment, because per-partition SSL termination is provided by a traffic director, the certificates can be managed in the traffic director keystores directly. As an example, a traffic director can support certificate and SSL management for partitions for the domain administrator. The SSL certificate (server certificate) for a partition can be configured on the virtual servers that are associated with the partition, if the host name(s) are specified. If a virtual target associated with a partition/resource group does not have a host name configured, then a server certificate cannot be configured separately for that partition/resource group, it will use the SSL configured on the incoming listener. And if multiple partitions share the same host names then they will share the same certificate.

In accordance with an embodiment, since all the certificates are created and owned by the domain administrator, the certificates are maintained in the same keystore and exported to the same wallet.

Traffic Director—Monitoring

In accordance with an embodiment, metrics can be gathered for each partition and exposed via DMS, stats-xml and SNMP. The MT console (EM) and WLST can then expose the partition metrics to either a domain administrator or a partition administrator. IIUC, the MT console (EM) can filter out the metrics of the particular partition that is being administered, while displaying the monitoring data of the partition.

Traffic Director—Logging

In accordance with an embodiment, each partition can be configured to have a separate access log at the traffic director. The server log will have log entries with the partition name (e.g., as a ODL supplemental field—"partition-name"). Note that only the log entries that are logged after identifying the partition will contain the partition name.

Traffic Director—Quiescing of Managed Servers

In accordance with an embodiment, the servers in a domain can be patched without causing any downtime to the partitions. The patching can be done as a rolling upgrade and as part of it each managed server of a cluster will be shutdown, patched and then started again using the patched binaries. The shutdown of the managed server can be done gracefully so that requests for existing session will continue to be processed until the sessions terminate or expire. For requests without any associated sessions (new session request), the managed server will return a HTTP 503 response code.

In accordance with an embodiment, a plugin can modify all the corresponding origin server (across all origin server pools) in "draining mode". Additionally, a traffic director can detect the 503 response code and automatically failover the request to another origin server of the origin server pool.

Traffic Director—Partition Migration

In accordance with an embodiment, the traffic director can support partition/resource migration. When resource groups are being migrated, the resource groups will be running on both the source cluster and the target cluster until all the sessions are migrated to the target cluster. During this time, it is expected for all requests to existing sessions to be routed to the source cluster (old cluster) and all new requests (not associated to any session) to be routed to the target cluster (new cluster). When all the session have been successfully migrated, then the cluster will switch over to the new cluster and all requests (with or without sessions) should be routed to the new cluster.

In accordance with an embodiment, a traffic director lifecycle plugin can modify the corresponding routes to make the old cluster the drain cluster and the new cluster as the active cluster.

Traffic Director Lifecycle Plugin

Figure 8:
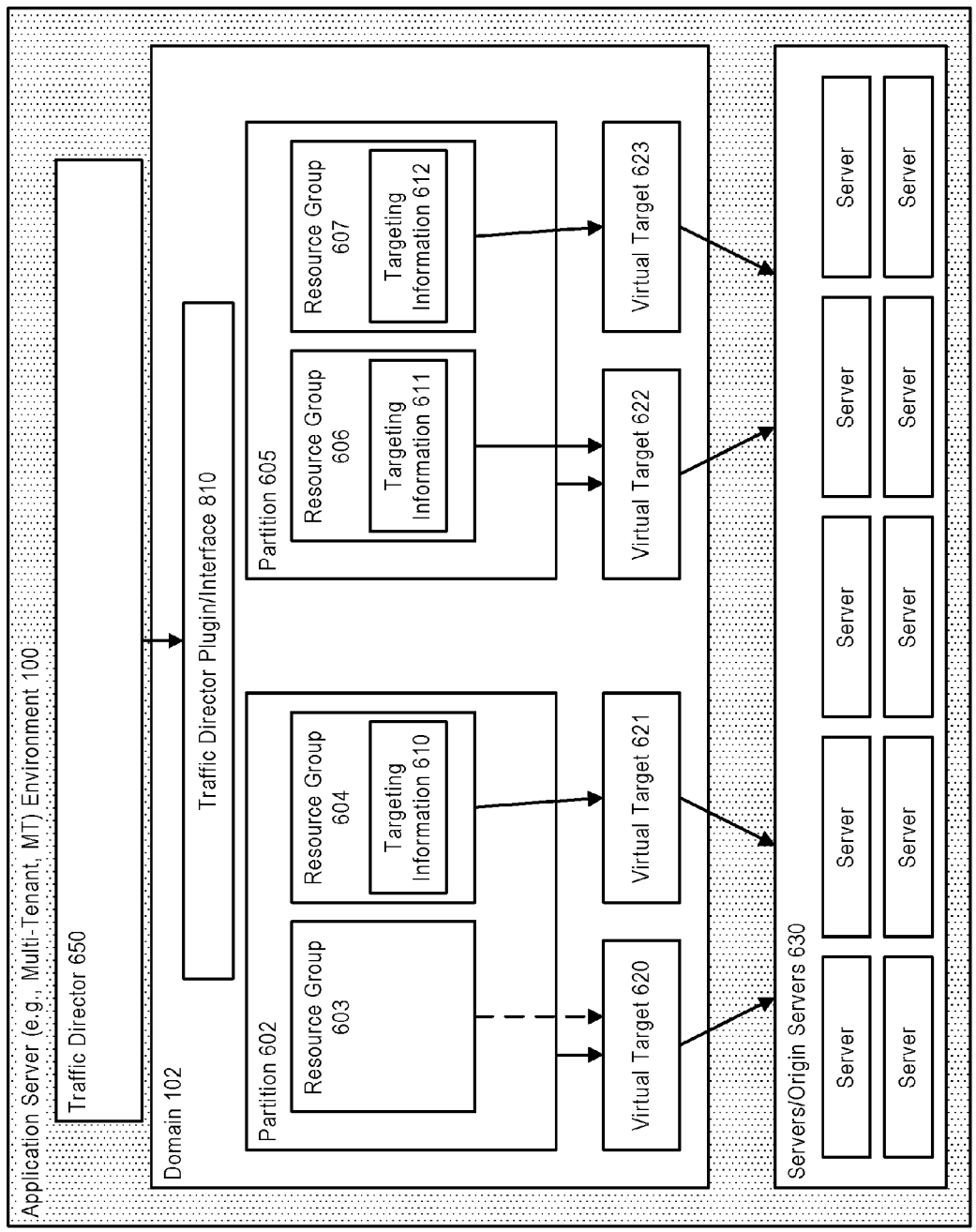
FIG. 8 illustrates traffic director support within a multi-tenant application server environment, in accordance with an embodiment.

FIG. 8 illustrates traffic director support within a multi-tenant application server environment, in accordance with an embodiment.

In accordance with an embodiment, an application server (e.g., MT application server) environment 100 can comprise a domain 102, a number of servers/origin servers 630, and can front end a traffic director 650. The domain 102 can contain a number of partitions, such as partition 602 and partition 605. Each of the partitions, in turn, can contain a number of resource groups, e.g., resource groups 603, 604, 606, and 607. Each resource group can, optionally, contain targeting information, such as targeting information 610, 611, and 612. As well, each partition and resource group can be associated with one or more virtual targets, such as virtual target 620, 621, 622, and 623. The traffic director 650 can be responsible for directing traffic to the virtual targets.

As shown in FIG. 8, a traffic director can configure/interface with a traffic director plugin 810. The traffic director plugin 810 can be responsible for load balancing between the virtual targets and the servers/origin servers associated with the server environment, each virtual target being mapped to a resource group in the partitions within the domain. The traffic director can comprise a partition plugin and/or a runtime plugin.

In accordance with an embodiment, a traffic director plugin can make changes in the traffic director (e.g., OTD) configuration whenever changes to the partitions and/or resource groups within the partitions are made.

In accordance with an embodiment, a partition lifecycle infrastructure provides APIs for partition specific operations such as create, update, delete, associate, dissociate, migrate, scale up, scale down, quiesce etc. When partition operations are performed within the application server environment, corresponding changes will be made to the front end traffic director.

In accordance with an embodiment, a traffic director can implement both partition plugin and runtime plugin for configuring the traffic director. A partition plugin implementation can make partition related changes (e.g., creation, deletion, migration) on the traffic director, and a runtime plugin implementation can configure a traffic director for scaling and quiescing.

Traffic Director Lifecycle Plugin—Partition Related Changes

In accordance with an embodiment, a partition plugin implementation can capture various WLS partition events and provide for corresponding traffic director configuration changes.

In accordance with an embodiment, a partition plugin implementation can capture an event a new resource group with access information (either virtual target host name and/or URI-prefix) and with runtime information (either cluster or list of individual managed server) is added to a partition. In response the traffic director configuration for a newly added resource group is configured when both access information and runtime information is available for it. The traffic director configuration for routing the traffic to a resource group involves a virtual server, a route and a origin server pool.

In accordance with an embodiment, a partition plugin implementation can capture when a resource group is re-targeted to a new virtual target. In response, a corresponding the traffic director configuration for the new virtual target can be created if it does not exist already. The configuration can include a virtual server (with the new virtual target host name), a route (with the new virtual target URI-prefix) and an origin server pool (with the cluster to which the new virtual target is targeted to). And the traffic director is appropriately configured to route traffic for the new virtual target host to the resource group In accordance with an embodiment, a partition plugin implementation can capture when a host name of the virtual target to which a resource group is targeted is modified. In response, a traffic director can be appropriately configured to route traffic for the new virtual host to the resource group.

In accordance with an embodiment, a partition plugin implementation can capture when a URI-prefix of the virtual target to which the resource group is targeted is modified. In response, a traffic director can be appropriately configured to route traffic for the new URI to the resource group.

In accordance with an embodiment, a partition plugin implementation can capture when aliases are added or removed for the host name of the virtual target. In response, a traffic director can be appropriately configured to route traffic for the virtual host and its aliases (FQDNs—fully qualified domain names) to the resource group. For example, a resource group may have www.soda.com as the virtual host. An alias of www.sodaco.com may be added to the resource group. In this case, traffic for both www.soda.com and www.sodaco.com can be directed to the same resource group.

In accordance with an embodiment, a partition plugin implementation can capture an event where a host name is removed from the virtual target to which a resource group is targeted. In response, if the virtual target to which the resource group is targeted has an URI-prefix associated with it, then the traffic is appropriately configured. However, if the virtual target does not have an URI-prefix associated with it, then all the traffic director artifacts related to the resource group are removed.

In accordance with an embodiment, a partition plugin implementation can capture when a URI-prefix is removed from the virtual target to which a resource group is targeted. In response, if the virtual target to which the resource group is targeted has a host name, then the traffic director can be appropriately configured. However, if the virtual target does not have a host name, then all the traffic director artifacts related to the resource group are removed.

In accordance with an embodiment, a partition plugin implementation can capture an event where the cluster association of a resource group is modified. In response, the traffic director can be appropriately configured to route to the corresponding origin server pool. If the corresponding origin server pool doesn't exist, then it is created.

In accordance with an embodiment, a partition plugin implementation can capture when cluster members are added/removed from an associated cluster of a resource group. In response, a corresponding traffic director origin server pool can be modified to reflect the current set of managed servers in the WLS cluster.

In accordance with an embodiment, a partition plugin implementation can capture when an individual list of managed servers associated with the resource group is modified. In response, a corresponding traffic director origin server pool will be modified to reflect the current list of managed servers.

In accordance with an embodiment, a partition plugin implementation can capture when a cluster association or list of individual managed servers of a resource group is removed. In response, all traffic director artifacts related to the resource group can be removed.

In accordance with an embodiment, a partition plugin implementation can capture if a resource group is removed. In response, all traffic director artifacts related to the resource group can be removed.

In accordance with an embodiment, a partition plugin implementation can capture when a partition is removed. In response, all traffic director artifacts related to the partition (including access logs) can be removed.

Partition Plugin

In accordance with an embodiment, a traffic director can implement an interface that allows for the creation of partition object.

In accordance with an embodiment, a create method creates a unique traffic partition object entry in server.xml, with the given partition name as unique identifier. An exemplary create method is shown here:

```
public LifecyclePartition create    (String partitionName,
                                     LifecycleContext ctx,
                                     LifecycleRuntime runtime)
                                     throws LifecycleException;
```

In accordance with an embodiment, if partition object with the same partition name already exists, an exception will be thrown. A partition specific access-log can also be created during this time. At this stage, the traffic director does not create any other artifacts. The only mandatory information that traffic director expects during this call is the partition name.

In accordance with an embodiment, an associate method can be provided. An exemplary associate method is shown here:

```
public void associate    (LifecycleContext ctx,
                          LifecyclePartition partition1,
                          LifecyclePartition partition2,
                          LifecycleRuntime runtime)
                          throws LifecycleException;
```

In accordance with an embodiment, the associate method associates a given partition in a domain (e.g., WLS Partition) and a traffic director (e.g., OTD) partition. During associate, the lifecycle plugin can create a partition snapshot with the current partition information and send the snapshot as a part of a lifecyclecontext. The traffic director lifecycle plugin can use this information to make corresponding traffic director configurations for front-ending the WLS partition and its resource groups.

In accordance with an embodiment, association can be successful if a partition (i.e., a partition within the domain) has at-least one resource group in it. Association can also be successful if the required access information is available for the specified resource group (i.e., either virtual target host name and/or URI-prefix). Association can be also successful if all the required runtime information is available for the specified resource group (e.g., the cluster/server to which the resource group is targeted and a listen address or listen port information of the server).

In accordance with an embodiment, a disassociate method can be provided. An exemplary disassociate method is shown here:

```
public abstract void dissociate    (LifecycleContext ctx,
                                    LifecyclePartition partition1,
                                    LifecyclePartition partition2,
                                    LifecycleRuntime runtime)
                                    throws LifecycleException;
```

In accordance with an embodiment, the disassociate method can dissociate a given partition and traffic director partition. During a dissociate method, the corresponding traffic director configurations that were used for front-ending the partitions and their resource groups can be removed. The partition snapshot in the lifecyclecontext will be empty for the dissociate call.

In accordance with an embodiment, an update method can be provided. An exemplary update method is shown here:

```
public abstract void LifecyclePartition update (String partitionName,
                                                LifecycleContext ctx,
                                                LifecycleRuntime runtime)
                                                throws LifecycleException;
```

In accordance with an embodiment, the update method makes the corresponding updates to the traffic director configurations based on the partition snapshot that is available in the lifecyclecontext. During update, the lifecycle plugin can re-create the latest partition snapshot and sends it as a part of lifecyclecontext.

In accordance with an embodiment, a delete method can be provided. An exemplary delete method is shown here:

```
public abstract void delete    (String partitionName,
                                LifecycleContext ctx,
                                LifecycleRuntime runtime)
                                throws LifecycleException;
```

In accordance with an embodiment, the delete method can delete the partition object entry from the server.xml. The delete method can also delete the corresponding traffic director configurations that were used to front-end the partitions if they are not deleted already. A partition name is the only required property for delete.

In accordance with an embodiment, a migrate method can be provided. An exemplary migrate method is shown here:

```
public abstract LifecyclePartition migrate    (String partitionName,
                                               String phase,
                                               LifecycleContext ctx,
                                               LifecycleRuntime runtime)
                                               throws LifecycleException;
```

In accordance with an embodiment, a migration method can be a two-step process for a traffic director. When the migration process is initiated (phase='start-migration'), a new traffic director origin-server-pool can be created (if it doesn't exist) with new cluster information that is available as a part of lifecyclecontext. The old origin-server-pool that corresponds to the old cluster can still be retained. At this point, all the existing requests will go to the old origin-server-pool, whereas the new requests will go the new origin-server-pool. When the migration process is ended (phase='end-migration'), then old origin-server-pool will be removed and only the new one will be retained.

In accordance with an embodiment, the following information can be provided to the traffic director upon a migrate call. The name of the resource group that is being migrated which is a part of the partition. The current cluster to which the resource group is target. And the target cluster to which the resource group will be migrated.

In response, in accordance with an embodiment, the traffic director configuration can be modified to mark the old cluster as a drain cluster, and to mark the new cluster as the active cluster for the specified resource group and the given partition.

Runtime Plugin

In accordance with an embodiment, a traffic director implement a lifecycle runtime plugin. This runtime plugin can be called for runtime related operations, such as scaling and quiescing.

In accordance with an embodiment, a scale up method can be provided. An exemplary scale up method is shown here:

```
public abstract void scaleUp(String runtimeName,
    int scaleFactor,
    LifecycleContext ctx)
        throws LifecycleException;
```

In accordance with an embodiment, during a scale up, a traffic director can create new origin-servers and add them to the existing origin-server-pool. The following information can be provided for the traffic director during the call to scale up: the cluster name of the cluster being scaled up, and listen address and listen port of the servers that are newly created during the scale up. The traffic director configuration can be modified to add the newly added origin servers to the origin pool.

In accordance with an embodiment, a scale down method can be provided. An exemplary scale down method is shown here:

```
public abstract void scaleDown(String runtimeName,
    int scaleFactor,
    LifecycleContext ctx)
        throws LifecycleException;
```

In accordance with an embodiment, during scale down, a traffic director can remove the corresponding origin-servers. This means, the on-going requests can be processed but no new requests will be allowed. The new requests can be load balanced amongst the other origin-servers in the origin-server-pool. The managed servers themselves can be shutdown gracefully to allow all the pending requests to be processed before the server shuts down.

In accordance with an embodiment, the following information can be provided for the traffic director during the call to scale down: the cluster name of the cluster being scaled down, and listen address and listen port of the servers that are to be removed during the scale down. The traffic director configuration can be modified to remove the origin servers that are brought down during the scale down operation.

In accordance with an embodiment, a quiesce method can be provided. An exemplary quiesce method is shown here:

```
public abstract void quiesce(String runtimeName,
    String phase,
    LifecycleContext ctx)
        throws LifecycleException;
```

In accordance with an embodiment, during quiesce, a traffic director can put the specified origin servers in the drain mode and will stop sending any new non-sticky requests to those origin servers. A listen address and listen port of the servers that are being quiesced can be provided to the traffic director, and in return, the traffic director can mark those origin servers for draining.

In accordance with an embodiment, a start method can be provided. An exemplary start method is shown here:

```
public abstract void start (String runtimeName,
    String phase,
    LifecycleContext ctx)
        throws LifecycleException;
```

In accordance with an embodiment, during start method, a traffic director can put the specified origin servers in the start mode and will resume traffic to those origin servers. A listen address and listen port of the servers that are being started can be provided to the traffic director, and in return, the traffic director can put the corresponding origin servers in start mode.

Figure 9:
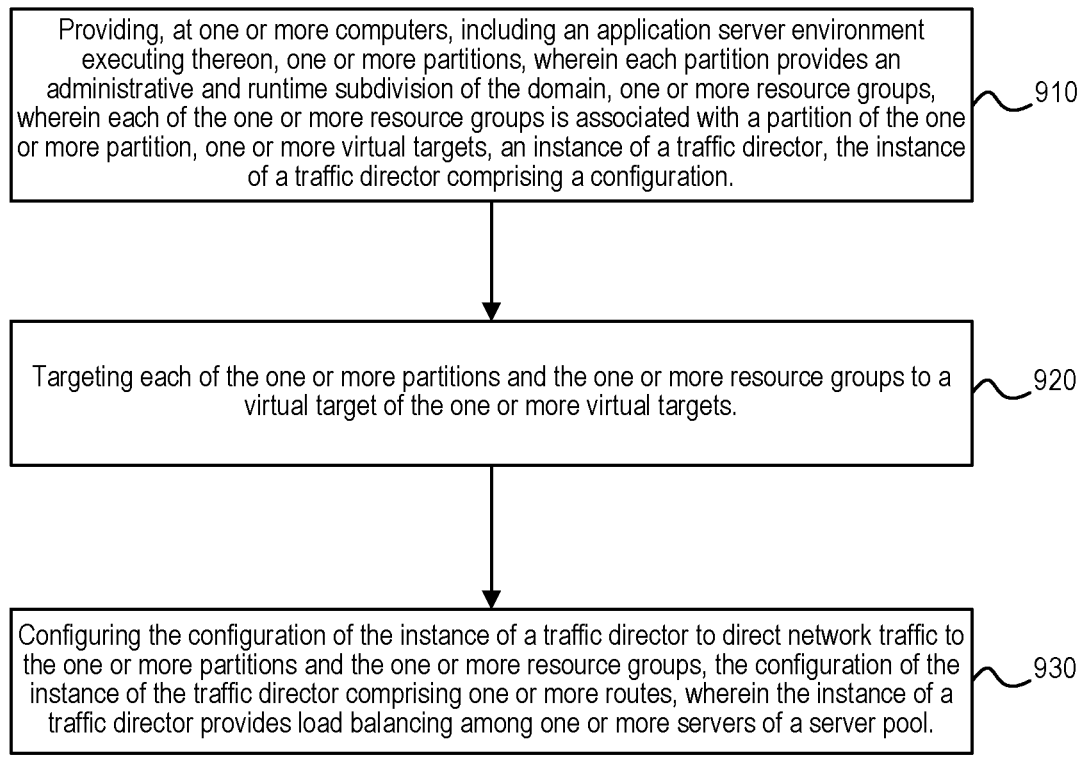
FIG. 9 is a flowchart of an exemplary method for traffic director support in a multitenant application server environment.

FIG. 9 is a flowchart of an exemplary method for traffic director support in a multitenant application server environment. At step 910, the method can provide, at one or more computers, including an application server environment executing thereon, one or more partitions, wherein each partition provides an administrative and runtime subdivision of the domain, one or more resource groups, wherein each of the one or more resource groups is associated with a partition of the one or more partition, one or more virtual targets, an instance of a traffic director, the instance of a traffic director comprising a configuration At step 920, the method can target each of the one or more partitions and the one or more resource groups to a virtual target of the one or more virtual targets.

At step 930, the method can configure the configuration of the instance of a traffic director to direct network traffic to the one or more partitions and the one or more resource groups, the configuration of the instance of the traffic director comprising one or more routes, wherein the instance of a traffic director provides load balancing among one or more servers of a server pool.

Figure 10:
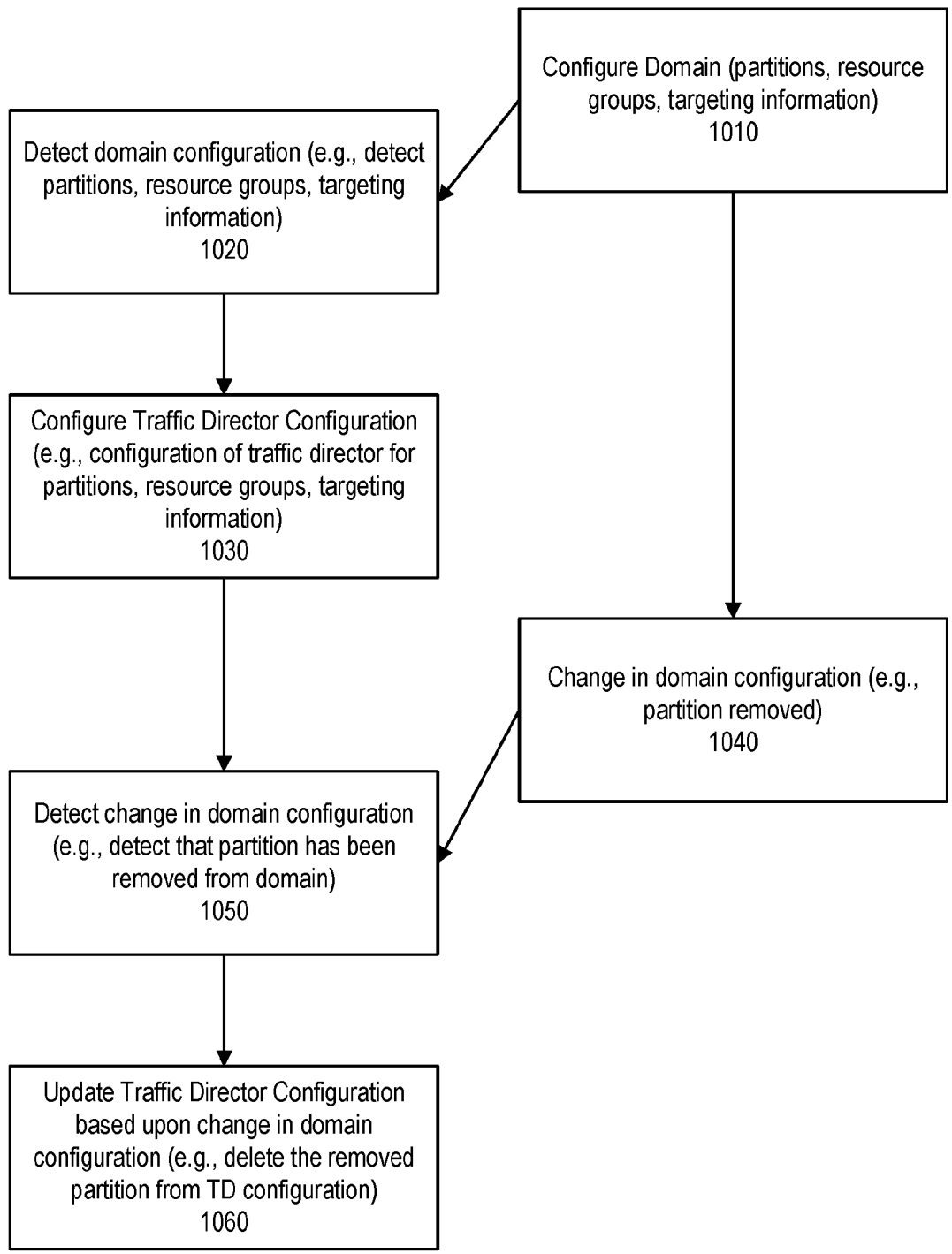
FIG. 10 is a flowchart of an exemplary method for traffic director support in a multitenant application server environment.

FIG. 10 is a flowchart of an exemplary method for traffic director support in a multitenant application server environment. At step 1010, a domain, such as domain 102 discussed above can be configured. The configuration of the domain can include the on-boarding or starting of one or multiple partitions, each of which can include various resource groups. As discussed above, each partition can be associated with a default virtual target, and the resource groups can also be targeted to the default virtual target, unless otherwise specified by targeting information associated with each of the resource groups. In such a situation, instead of being targeted to the default virtual target, the resource groups can instead be targeted to another virtual target. Each of the virtual targets can additionally be associated with one or a cluster of servers, such as origin servers.

At step 1020, the configuration of the domain can be detected, for example by the lifecycle partition plugin. Such detection can comprise detecting, within the domain, the various partitions, resource groups, targeting information, virtual targets, origin server clusters, and the like.

At step 1030, the traffic director configuration can be configured, via, for example, the lifecycle partition plugin. This can include, for example, adding partitions, resource groups, targeting information, virtual targets, origin server clusters, and the like, to the configuration of the traffic director.

At step 1040, a change in the domain configuration can occur. This can be, for example, a removal of a partition from the domain. Other examples could include an addition of a partition, the addition or removal of a resource group, updating of virtual target information, and the like.

At step 1050, the change in the configuration of the domain can be detected, for example by the lifecycle partition plugin. Such detection of the change can comprise detecting, within the domain, the removal of a partition. Other examples could include detecting the addition of a partition, the addition or removal of a resource group, the updating of virtual target information, and the like.

At step 1060, the traffic director configuration can be updated to reflect the detected change in configuration of the domain. For example, if the detected change in the domain was a removal of a partition, then the traffic director configuration can be updated to remove the partition from the traffic director configuration. Other examples could include updating the configuration of the traffic director to add a partition, add or delete a resource group, update virtual target information, and the like.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for traffic director support in a multitenant application server environment, comprising:
   one or more computers, including an application server that enables deployment and execution of software applications, wherein the application server is associated with a domain configuration that is used at runtime to define a domain for the execution of the software applications, together with
   a plurality of partitions, wherein each partition provides an administrative and runtime subdivision of the domain,
   one or more resource groups, wherein each of the one or more resource groups is associated with a partition of the one or more partition,
   a plurality of virtual targets,
   an instance of a traffic director, the instance of a traffic director comprising a configuration, and
   a traffic director plugin instantiated within the domain, the traffic director plugin providing access to the domain, the traffic director plugin further providing access to a plurality of lifecycle operations of the domain;
   wherein each of the plurality of partitions and the one or more resource groups are targeted to a virtual target of the plurality of virtual targets;
   wherein the configuration of the instance of a traffic director is configured to direct network traffic to the plurality of partitions and the one or more resource groups, the configuration of the instance of the traffic director comprising one or more routes; and
   wherein the instance of a traffic director provides load balancing among one or more servers of a server pool.

2. The system of claim 1, wherein the multitenant application server environment is provided within a cloud environment, to support multiple tenants operating within the cloud environment.

3. The system of claim 2, wherein each route is directed through a virtual target of the plurality of virtual targets.

4. The system of claim 3, wherein upon a partition operation on a partition of the plurality of partitions, the traffic director plugin updates the configuration of the instance of the traffic director.

5. The system of claim 4, wherein the partition operation is one of create, associate, dissociate, update, delete, and migrate.

6. The system of claim 3, wherein upon a runtime operation of the plurality of partitions, the traffic director plugin updates the configuration of the instance of the traffic director.

7. The system of claim 6, wherein the runtime operation is of one of scale up, scale down, quiesce, and start.

8. A method for traffic director support in a multitenant application server environment, comprising:
   providing, at one or more computers, including an application server that enables deployment and execution of software applications, wherein the application server is associated with a domain configuration that is used at runtime to define a domain for the execution of the software applications, a plurality of partitions, wherein each partition provides an administrative and runtime subdivision of the domain, one or more resource groups, wherein each of the one or more resource groups is associated with a partition of the one or more partition, a plurality of virtual targets, an instance of a traffic director, the instance of a traffic director comprising a configuration, and a traffic director plugin instantiated within the domain, the traffic director plugin providing access to the domain, the traffic director plugin further providing access to a plurality of lifecycle operations of the domain;

targeting each of the plurality of partitions and the one or more resource groups to a virtual target of the plurality of virtual targets; and configuring the configuration of the instance of a traffic director to direct network traffic to the plurality of partitions and the one or more resource groups, the configuration of the instance of the traffic director comprising one or more routes; and wherein the instance of a traffic director provides load balancing among one or more servers of a server pool.

9. The method of claim 8, wherein the multitenant application server environment is provided within a cloud environment, to support multiple tenants operating within the cloud environment.

10. The method of claim 9, wherein each route is directed through a virtual target of the plurality of virtual targets.

11. The method of claim 10, wherein upon a partition operation on a partition of the plurality of partitions, the traffic director plugin updates the configuration of the instance of the traffic director.

12. The method of claim 11, wherein the partition operation is one of create, associate, dissociate, update, delete, and migrate.

13. The method of claim 10, wherein upon a runtime operation of the plurality of partitions, the traffic director plugin updates the configuration of the instance of the traffic director.

14. The method of claim 13, wherein the runtime operation is of one of scale up, scale down, quiesce, and start.

15. A non-transitory computer readable storage medium, including instructions stored thereon for traffic director support in a multitenant application server environment, which when read and executed by one or more computers cause the one or more computers to perform the steps comprising:

providing, at one or more computers, including an application server that enables deployment and execution of software applications, wherein the application server is associated with a domain configuration that is used at runtime to define a domain for the execution of the software applications, a plurality of partitions, wherein each partition provides an administrative and runtime subdivision of the domain, one or more resource groups, wherein each of the one or more resource groups is associated with a partition of the one or more partition, a plurality of virtual targets, an instance of a traffic director, the instance of a traffic director comprising a configuration, and a traffic director plugin instantiated within the domain, the traffic director plugin providing access to the domain, the traffic director plugin further providing access to a plurality of lifecycle operations of the domain;

targeting each of the plurality of partitions and the one or more resource groups to a virtual target of the plurality of virtual targets; and configuring the configuration of the instance of a traffic director to direct network traffic to the plurality of partitions and the one or more resource groups, the configuration of the instance of the traffic director comprising one or more routes; and wherein the instance of a traffic director provides load balancing among one or more servers of a server pool.

16. The non-transitory computer readable storage medium of claim 15, wherein the multitenant application server environment is provided within a cloud environment, to support multiple tenants operating within the cloud environment.

17. The non-transitory computer readable storage medium of claim 16, wherein each route is directed through a virtual target of the plurality of virtual targets.

18. The non-transitory computer readable storage medium of claim 17, wherein upon a partition operation on a partition of the plurality of partitions, the traffic director plugin updates the configuration of the instance of the traffic director.

19. The non-transitory computer readable storage medium of claim 18, wherein a partition operation is one of create, associate, dissociate, update, delete, and migrate.

20. The non-transitory computer readable storage medium of claim 17, wherein upon a runtime operation of the plurality of partitions, the traffic director plugin updates the configuration of the instance of the traffic director, and wherein the runtime operation is of one of scale up, scale down, quiesce, and start.

* * * * *

UNITED STATES PATENT AND TRADEMARK OFFICE
CERTIFICATE OF CORRECTION

PATENT NO. : 10,250,512 B2
APPLICATION NO. : 15/213166
DATED : April 2, 2019
INVENTOR(S) : Sidde et al.

Page 1 of 1

It is certified that error appears in the above-identified patent and that said Letters Patent is hereby corrected as shown below:

In the Specification

In Column 12, Lines 4-5, delete ""www.mycopmany.com"," and insert -- "www.mycompany.com", --, therefor.

In Column 16, Line 23, delete "group" and insert -- group. --, therefor.

In Column 20, Line 47, delete "configuration" and insert -- configuration. --, therefor.

Signed and Sealed this
Third Day of November, 2020

Andrei Iancu
*Director of the United States Patent and Trademark Office*